(12) United States Patent
Iwata et al.

(10) Patent No.: US 12,534,624 B2
(45) Date of Patent: Jan. 27, 2026

(54) INFRARED CUT-OFF FILTER, SOLID-STATE IMAGE SENSOR FILTER, SOLID-STATE IMAGE SENSOR, AND METHOD FOR PRODUCING SOLID-STATE IMAGE SENSOR FILTER

(71) Applicant: TOPPAN Inc., Tokyo (JP)

(72) Inventors: Reiko Iwata, Taito-ku (JP); Yuri Hirai, Taito-ku (JP); Hanae Tagami, Taito-ku (JP); Takenori Goda, Taito-ku (JP); Hiroyuki Chinone, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 889 days.

(21) Appl. No.: 17/697,077

(22) Filed: Mar. 17, 2022

(65) Prior Publication Data

US 2022/0213325 A1    Jul. 7, 2022

Related U.S. Application Data

(63) Continuation of application No. PCT/JP2020/035342, filed on Sep. 17, 2020.

(30) Foreign Application Priority Data

Sep. 17, 2019  (JP) ................. 2019-168811
Sep. 17, 2019  (JP) ................. 2019-168812
Sep. 17, 2019  (JP) ................. 2019-168813

(51) Int. Cl.
*G02B 5/22*       (2006.01)
*C08F 20/18*      (2006.01)
*C08K 5/529*      (2006.01)
*C09B 23/00*      (2006.01)
*C09B 67/20*      (2006.01)
(Continued)

(52) U.S. Cl.
CPC .......... *C09B 67/0063* (2013.01); *C08F 20/18* (2013.01); *C08K 5/529* (2013.01); *C09B 23/00* (2013.01); *G02B 1/04* (2013.01); *G02B 5/208* (2013.01)

(58) Field of Classification Search
CPC ................. G02B 5/22; G02B 5/208
See application file for complete search history.

(56) References Cited

U.S. PATENT DOCUMENTS

| 2005/0163958 A1 | 7/2005  | Nakatsugawa |
| 2007/0259279 A1 | 11/2007 | Imai et al. |
| 2011/0262863 A1 | 10/2011 | Tachibana et al. |

FOREIGN PATENT DOCUMENTS

| JP | 2003-060176 A | 2/2003 |
| JP | 2004-069758 A | 3/2004 |

(Continued)

OTHER PUBLICATIONS

International Search Report issued Nov. 2, 2020 in PCT/JP2020/035342 filed Sep. 17, 2020, 7 pages, with English Translation.

(Continued)

*Primary Examiner* — Catherine S Branch
(74) *Attorney, Agent, or Firm* — Oblon, McClelland, Maier & Neustadt, L.L.P.

(57) ABSTRACT

An infrared cut-off filter including a cyanine dye including a tris(pentafluoroethyl) trifluorophosphate anion and a cation having a polymethine and a nitrogen-containing heterocycle located at each end of the polymethine, and an acrylic polymer having a unit structure of formula (1).

20 Claims, 1 Drawing Sheet

(51) Int. Cl.
*G02B 1/04* (2006.01)
*G02B 5/20* (2006.01)

(56) References Cited

FOREIGN PATENT DOCUMENTS

| | | |
|---|---|---|
| JP | 2005-084476 A | 3/2005 |
| JP | 2005-164972 A | 6/2005 |
| JP | 2007-219114 A | 8/2007 |
| JP | 2011-242751 A | 12/2011 |
| JP | 2013-155353 A | 8/2013 |
| JP | 2018-060910 A | 4/2018 |
| KR | 10-2007-0043858 A | 4/2007 |
| WO | WO 2017/098996 A1 | 6/2017 |
| WO | WO 2018/101219 A1 | 6/2018 |

OTHER PUBLICATIONS

Extended European Search Report issued Nov. 15, 2022 in European Patent Application No. 20866782.4, 8 pages.
Korean Office Action issued Apr. 22, 2025 in Korean Patent Application No. 10-2022-7005337, 10 pages.

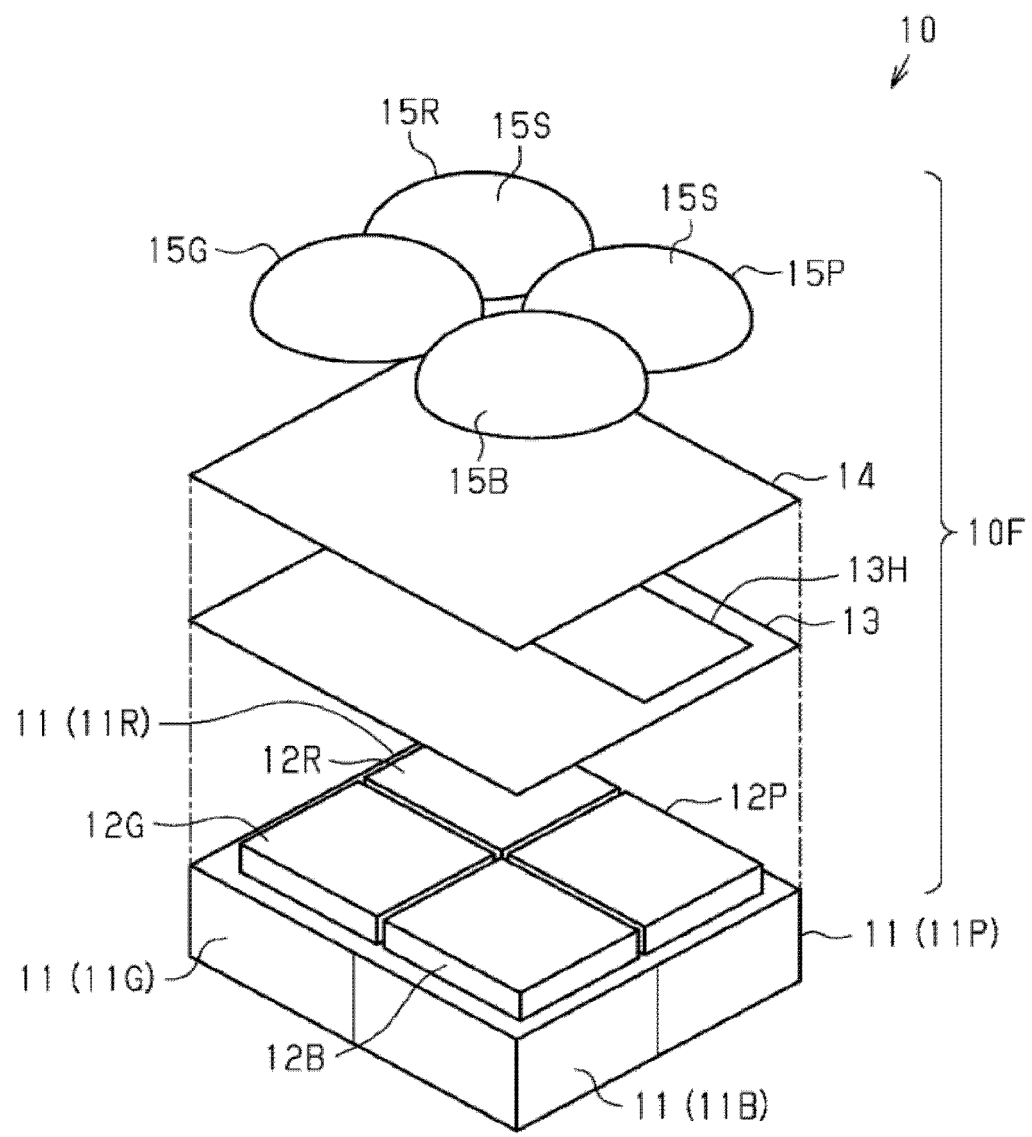

INFRARED CUT-OFF FILTER, SOLID-STATE IMAGE SENSOR FILTER, SOLID-STATE IMAGE SENSOR, AND METHOD FOR PRODUCING SOLID-STATE IMAGE SENSOR FILTER

CROSS-REFERENCE TO RELATED APPLICATIONS

The present application is a continuation of International Application No. PCT/JP2020/035342, filed Sep. 17, 2020, which is based upon and claims the benefits of priority to Japanese Application No. 2019-168811, filed Sep. 17, 2019, Japanese Application No. 2019-168812, filed Sep. 17, 2019, and Japanese Application No. 2019-168813, filed Sep. 17, 2019. The entire contents of all of the above applications are incorporated herein by reference.

BACKGROUND OF THE INVENTION

Field of the Invention

The present invention relates to an infrared cut-off filter, a solid-state image sensor filter having an infrared cut-off filter, a solid-state image sensor, and a method for producing a solid-state image sensor filter.

Discussion of the Background

Solid-state image sensors such as CMOS image sensors and CCD image sensors include photoelectric conversion elements that convert the intensity of light into an electrical signal. An example of the solid-state image sensor is capable of detecting a plurality of types of light corresponding to different colors. The solid-state image sensor includes color filters and color photoelectric conversion elements for respective colors, and detects respective color light by the photoelectric conversion elements for respective colors (for example, see PTL 1). Another example of the solid-state image sensor includes an organic photoelectric conversion element and an inorganic photoelectric conversion element, and detects respective color light by the respective photoelectric conversion elements without using a color filter (for example, see PTL 2).

The solid-state image sensor includes an infrared cut-off filter on the photoelectric conversion element. The infrared cut-off filter absorbs infrared light to cut off infrared light which may otherwise be detected by the respective photoelectric conversion elements. Accordingly, detection accuracy of visible light in the respective photoelectric conversion elements can be improved. The infrared cut-off filter may contain, for example, a cyanine dye (for example, see PTL 3).

PTL 1: JP 2003-060176 A
PTL 2: JP 2018-060910 A
PTL 3: JP 2007-219114 A

SUMMARY OF THE INVENTION

According to an aspect of the present invention, an infrared cut-off filter including a cyanine dye including a tris(pentafluoroethyl) trifluorophosphate anion and a cation having a polymethine and a nitrogen-containing heterocycle located at each end of the polymethine, and an acrylic polymer having a unit structure of formula (1).

According to another aspect of the present invention, an infrared cut-off filter including a cyanine dye including a tris(pentafluoroethyl) trifluorophosphate anion and a cation having a polymethine and a nitrogen-containing heterocycle located at each end of the polymethine, and an acrylic polymer having a unit structure of formula (2).

According to still another aspect of the present invention, an infrared cut-off filter including a cyanine dye including a tris(pentafluoroethyl) trifluorophosphate anion and a cation having a polymethine and a nitrogen-containing heterocycle located at each end of the polymethine, and an acrylic polymer having a unit structure of formula (3).

According to yet another aspect of the present invention, a method for producing a solid-state image sensor filter includes forming an infrared cut-off filter, and patterning the infrared cut-off filter by dry etching. The infrared cut-off filter includes a cyanine dye including a tris(pentafluoroethyl) trifluorophosphate anion and a cation having a polymethine and a nitrogen-containing heterocycle located at each end of the polymethine, and an acrylic polymer having a unit structure of formula (1), (2) or (3).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is an exploded perspective view of a layer structure according to an embodiment of a solid-state image sensor.

DESCRIPTION OF THE EMBODIMENTS

The embodiments will now be described with reference to the accompanying drawings, wherein like reference numerals designate corresponding or identical elements throughout the various drawings.

First Embodiment

With reference to the FIGURE, a first embodiment of an infrared cut-off filter, a solid-state image sensor filter, a solid-state image sensor, and a method for producing a solid-state image sensor filter will be described. The FIGURE is a schematic configuration diagram in which layers in part of a solid-state image sensor are separately illustrated. In the present embodiment, infrared light refers to light having a wavelength in the range of 0.7 µm or more and 1 mm or less, and near-infrared light refers to infrared light specifically having a wavelength in the range of 700 nm or more and 1100 nm or less.

Solid-State Image Sensor

As shown in the FIGURE, a solid-state image sensor 10 includes a solid-state image sensor filter 10F and a plurality of photoelectric conversion elements 11. The solid-state image sensor filter 10F includes a plurality of visible light filters 12R, 12G and 12B, an infrared pass filter 12P, an infrared cut-off filter 13, a barrier layer 14, a plurality of visible light microlenses 15R, 15G and 15B, and an infrared microlens 15P.

The plurality of photoelectric conversion elements 11 are composed of a red photoelectric conversion element 11R, a green photoelectric conversion element 11G, a blue photoelectric conversion element 11B, and an infrared photoelectric conversion element 11P. The solid-state image sensor 10 includes a plurality of red photoelectric conversion elements 1R, a plurality of green photoelectric conversion elements 11G, a plurality of blue photoelectric conversion elements 1B, and a plurality of infrared photoelectric conversion elements 1P. The plurality of infrared photoelectric conversion elements 1P measure the intensity of infrared light. It should be noted that the FIGURE illustrates a repeating unit of the photoelectric conversion element 11 in the solid-state image sensor 10 for convenience of illustration.

The visible light color filters are composed of the red filter 12R, the green filter 12G, and the blue filter 12B. The red filter 12R is disposed on a light-incident side of the red photoelectric conversion element 11R. The green filter 12G is disposed on a light-incident side of the green photoelectric conversion element 11G. The blue filter 12B is disposed on a light-incident side of the blue photoelectric conversion element 11B.

The solid-state image sensor filter 10F includes the infrared pass filter 12P on a light-incident side of the infrared photoelectric conversion element 11P. The infrared pass filter 12P cuts off the visible light which may otherwise be detected by the infrared photoelectric conversion element 11P to prevent it from reaching the infrared photoelectric conversion element 11P. In other words, the infrared pass filter prevents the visible light which may otherwise be detected by the infrared photoelectric conversion element 11P from passing through to the infrared photoelectric conversion element 11P. This improves detection accuracy of infrared light by the infrared photoelectric conversion element 11P. The infrared light that may be detected by the infrared photoelectric conversion element 11P is near-infrared light having a wavelength of, for example, 700 nm or more and 1100 nm or less. The infrared pass filter 12P may be produced by, for example, forming a coating film containing a black photosensitive resin and patterning the coating film by using a photolithography method.

The infrared cut-off filter 13 is disposed on a light-incident side of the color filters 12R, 12G, and 12B. The infrared cut-off filter 13 has a through hole 13H such that the infrared cut-off filter 13 is not present on a light-incident side of the infrared pass filter 12P. The infrared cut-off filter 13 is common to the red filter 12R, the green filter 12G, and the blue filter 12B. The infrared cut-off filter 13 overlaps the respective color filters 12R, 12G and 12B when viewed in a direction in which the solid-state image sensor filter 10F overlaps the photoelectric conversion element 11. That is, the red filter 12R, the green filter 12G, and the blue filter 12B are covered with a single infrared cut-off filter 13.

The barrier layer 14 prevents an oxidation source from passing through the infrared cut-off filter 13. The oxidation source may be oxygen, water, or the like. The barrier layer 14 preferably has an oxygen transmission rate of, for example, 5.0 cc/m²/day/atm or less. The oxygen transmission rate is a value according to JIS K 7126:2006. Due to the oxygen transmission rate being set to 5.0 cc/m²/day/atm or less, the barrier layer 14 prevents an oxidation source from reaching the infrared cut-off filter 13 so that the infrared cut-off filter 13 is not likely to be oxidized by the oxidation source. This improves light resistance of the infrared cut-off filter 13.

The material forming the barrier layer 14 is an inorganic compound, and preferably a silicon compound. The material forming the barrier layer 14 may be, for example, at least one selected from the group consisting of silicon nitride, silicon oxide, and silicon oxynitride.

The microlenses include the red microlens 15R, the green microlens 15G, the blue microlens 15B, and the infrared microlens 15P. The red microlens 15R is disposed on a light-incident side of the red filter 12R. The green microlens 15G is disposed on a light-incident side of the green filter 12G. The blue microlens 15B is disposed on a light-incident side of the blue filter 12B. The infrared microlens 15P is disposed on a light-incident side of the infrared pass filter 12P.

The microlenses 15R, 15G, 15B and 15P have a light-incident surface 15S which is an outer surface. In order to collect light incident on the light-incident surface 15S toward the respective photoelectric conversion elements 11R, 11G, 11B and 11P, the microlenses 15R, 15G, 15B and 15P have a refractive index different from a refractive index of the outside air.

Infrared Cut-Off Filter

The infrared cut-off filter 13 will be described in more detail below.

The infrared cut-off filter 13 includes: a cyanine dye containing a cation having a polymethine and a nitrogen-containing heterocycle located at each end of the polymethine, and a tris(pentafluoroethyl) trifluorophosphate (FAP) anion; and an acrylic polymer having a unit structure represented by the following formula (1). The cyanine dye contains a cation and an anion. In the present embodiment, the cyanine dye contains a cation as a compound containing a nitrogen atom, and an FAP anion.

<Chem. 4>

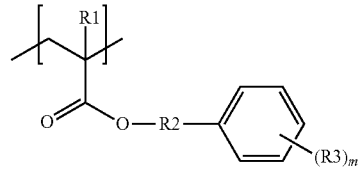

formula (1)

In the above formula (1), R1 is a hydrogen atom or a methyl group. R2 is a single bond, a linear alkylene group having 1 or more carbon atoms, a branched alkylene group having 3 or more carbon atoms, or an oxyalkylene group having 1 or more carbon atoms. R3 is a hydrogen atom or a predetermined substituent. M is any integer from 1 to 5 when R3 is a substituent.

The cyanine dye may also have a structure represented by the following formula (4).

<Chem. 5>

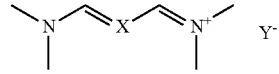

formula (4)

In the above formula (4), X is one methine or a polymethine. A hydrogen atom bonded to a carbon atom contained in the methine may also be substituted by a halogen atom or an organic group. The polymethine may also have a cyclic structure containing carbons that constitutes the polymethine. The cyclic structure can contain 3 consecutive carbons in a plurality of carbons that constitute the polymethine. When the polymethine has a cyclic structure, the polymethine may have 5 or more carbon atoms. Each nitrogen atom is contained in a 5-membered or 6-membered heterocycle. The heterocycles may be fused. $Y^-$ is an anion.

Further, the cyanine dye may have a structure represented by the following formula (5).

<Chem. 6>

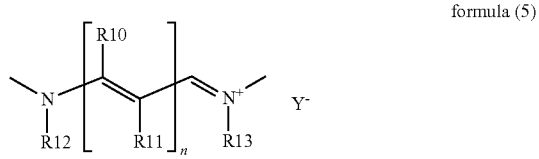

formula (5)

In the above formula (5), $Y^-$ is an anion. In the formula (5), n is an integer of 1 or more. n represents the number of repeating structures in the polymethine chain. R10 and R11 are hydrogen atoms or organic groups. R12 and R13 are hydrogen atoms or organic groups. R12 and R13 are preferably linear alkyl groups having 1 or more carbon atoms or branched alkyl groups. Each nitrogen atom is contained in a 5-membered or 6-membered heterocycle. The heterocycles may be fused.

Furthermore, when the polymethine has a cyclic structure in the formula (4), the cyclic structure may include, for example, at least one unsaturated bond such as an ethylenic double bond such that the unsaturated bond has electron resonance as part of the polymethine chain. Examples of such cyclic structure include cyclopentene rings, cyclopentadiene rings, cyclohexene rings, cyclohexadiene rings, cycloheptene rings, cyclooctene rings, cyclooctadiene rings and benzene rings. These cyclic structures may include a substituent.

Examples of the organic group represented by R10 and R11 include an alkyl group, an aryl group, an aralkyl group, and an alkenyl group. The alkyl group may be, for example, a methyl group, an ethyl group, a propyl group, an isopropyl group, a n-butyl group, a sec-butyl group, an isobutyl group, a tert-butyl group, an isopentyl group, a neopentyl group, a hexyl group, a cyclohexyl group, an octyl group, a nonyl group, a decyl group, or the like. The aryl group may be, for example, a phenyl group, a tolyl group, a xylyl group, a naphthyl group, or the like. The aralkyl group may be, for example, a benzyl group, a phenylethyl group, a phenylpropyl group, or the like. The alkenyl group may be, for example, a vinyl group, an allyl group, a propenyl group, an isopropenyl group, a butenyl group, a hexenyl group, a cyclohexenyl group, an octenyl group, or the like.

Further, at least part of the hydrogen atoms contained in each organic group may be substituted by a halogen atom or a cyano group. The halogen atom may be fluorine, bromine, chlorine, or the like. The substituted organic group may be, for example, a chloromethyl group, a chloropropyl group, a bromoethyl group, a trifluoropropyl group, a cyanoethyl group, or the like.

R12 or R13 may be, for example, an ethyl group, a propyl group, an isopropyl group, a n-butyl group, a sec-butyl group, an isobutyl group, a tert-butyl group, an isopentyl group, a neopentyl group, a hexyl group, a cyclohexyl group, an octyl group, a nonyl group, a decyl group, or the like.

A heterocycle containing a nitrogen atom may be, for example, pyrrole, imidazole, thiazole, pyridine, or the like.

A cation contained in the cyanine dye may have a structure represented by, for example, the following formula (6) or formula (7).

<Chem. 7>

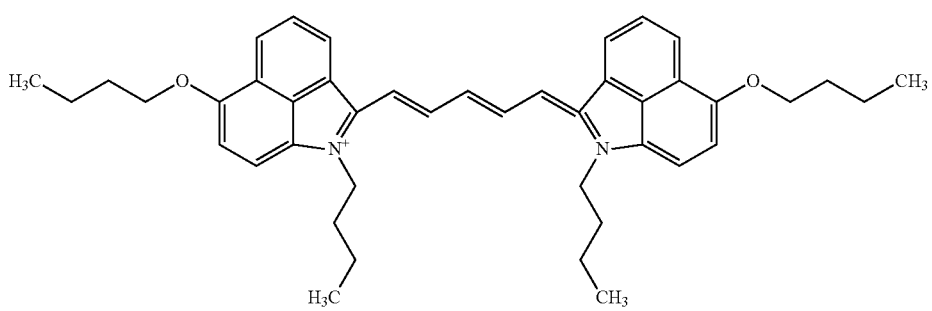

formula (6)

<Chem. 8>

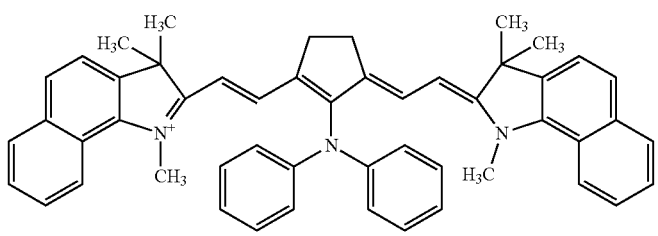

formula (7)

Furthermore, in the formula (5), a compound where n is 1 is cyanine, a compound where n is 2 is carbocyanine, and a compound where n is 3 is dicarbocyanine. In the formula (5), a compound where n is 4 is tricarbocyanine.

Further, a cation contained in the cyanine dye may have a structure represented by, for example, the following formula (8) to formula (47). That is, each nitrogen atom contained in the cyanine dye may be contained in the following structures.

<Chem. 9>
formula (8)
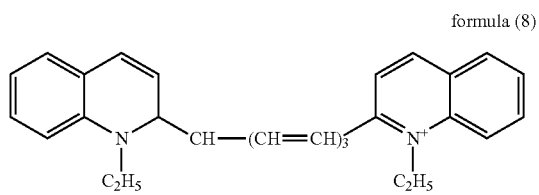
<Chem. 10>
formula (9)
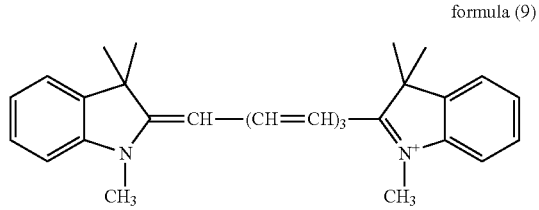
<Chem. 11>
formula (10)
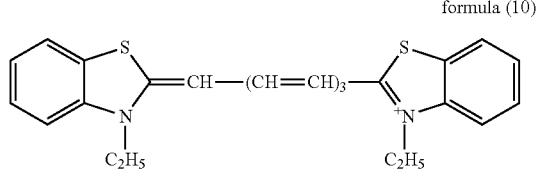
<Chem. 12>
formula (11)
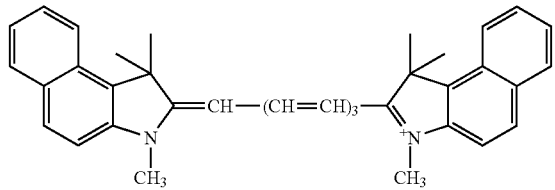
<Chem. 13>
formula (12)
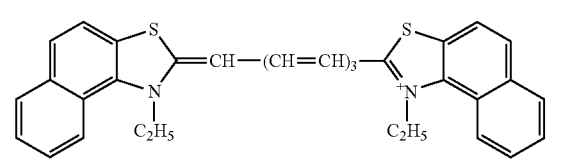
<Chem. 14>
formula (13)
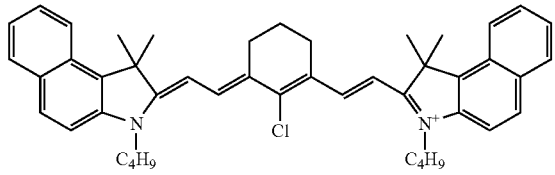
<Chem. 15>
formula (14)
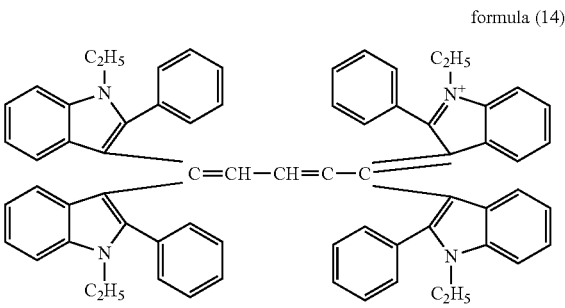
<Chem. 16>
formula (15)
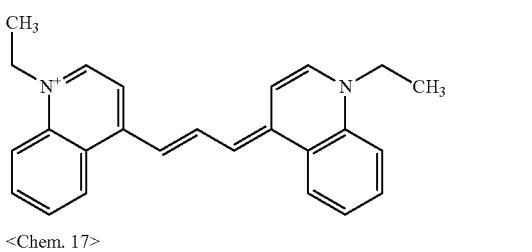
<Chem. 17>
formula (16)
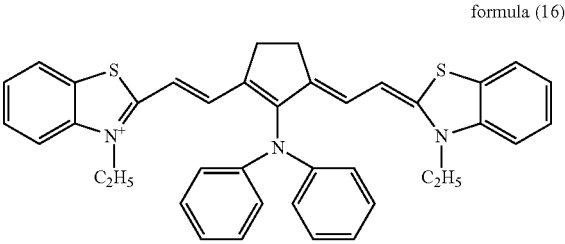
<Chem. 18>
formula (17)
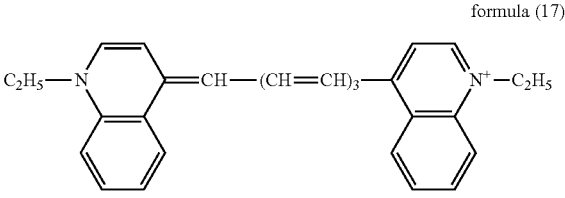
<Chem. 19>
formula (18)
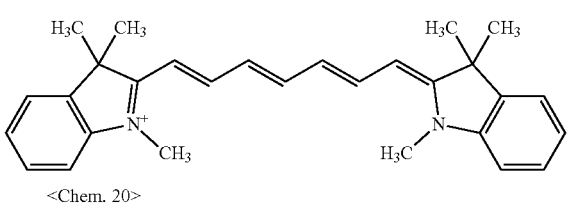
<Chem. 20>
formula (19)
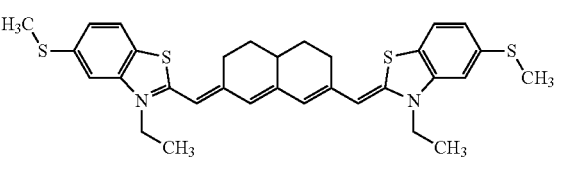

<Chem. 21>
formula (20)
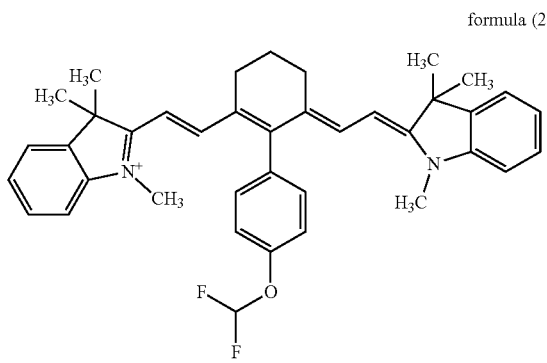
<Chem. 22>
formula (21)
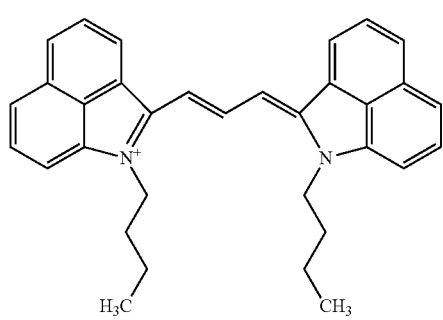
<Chem. 23>
formula (22)
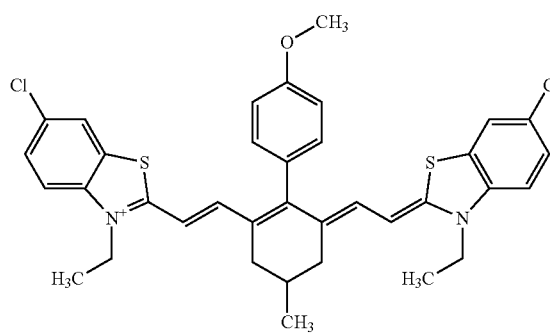
<Chem. 24>
formula (23)
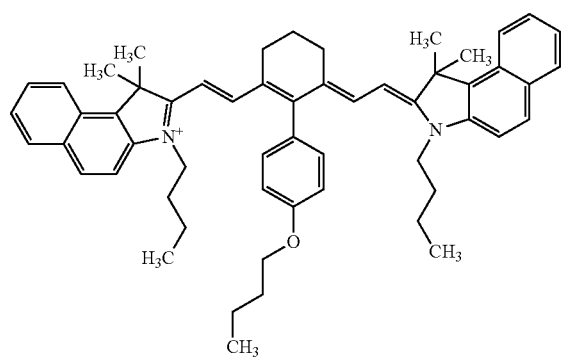
<Chem. 25>
formula (24)
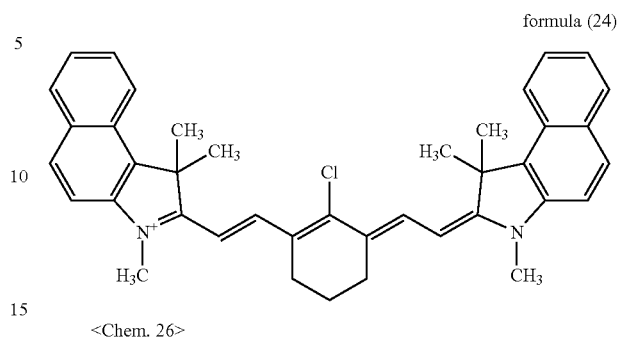
<Chem. 26>
formula (25)
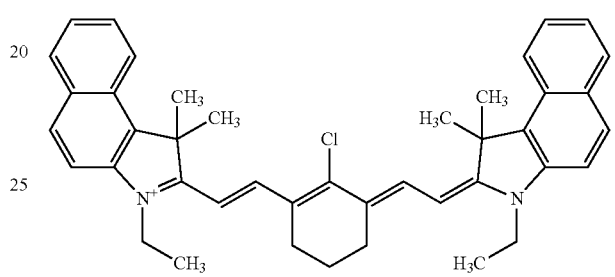
<Chem. 27>
formula (26)
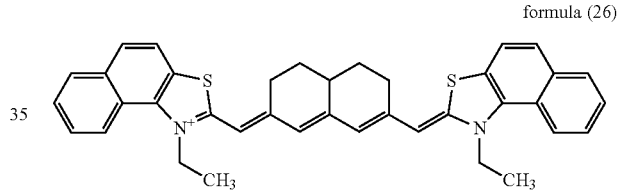
<Chem. 28>
formula (27)
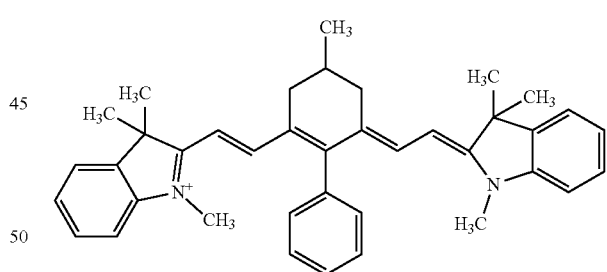
<Chem. 29>
formula (28)
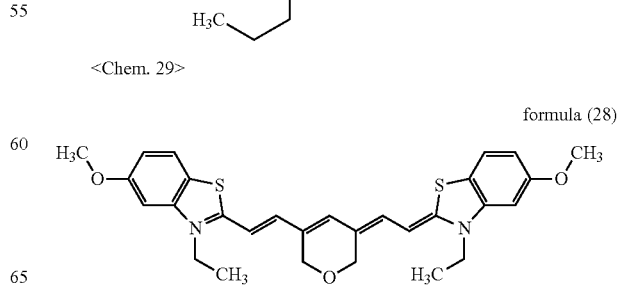

<Chem. 30>
formula (29)
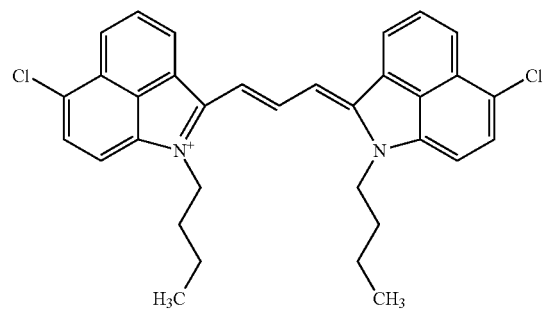
<Chem. 31>
formula (30)
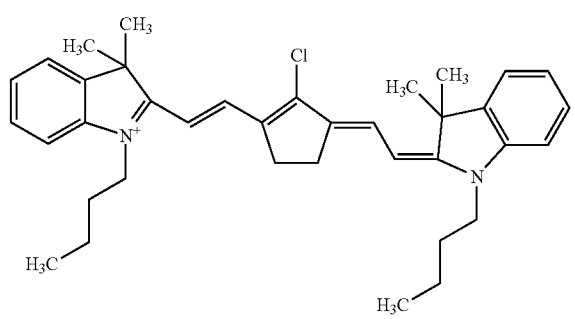
<Chem. 32>
formula (31)
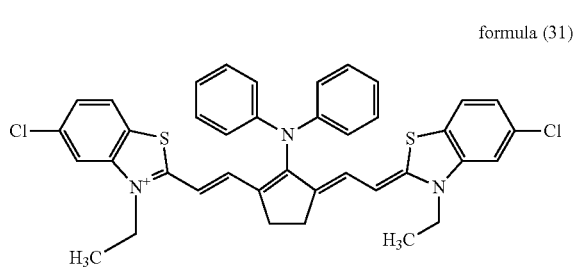
<Chem. 33>
formula (32)
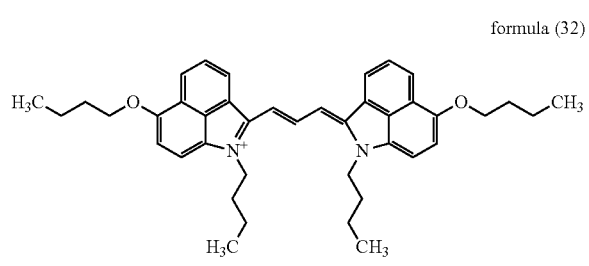
<Chem. 34>
formula (33)
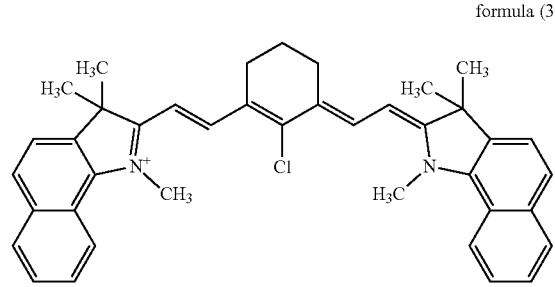
<Chem. 35>
formula (34)
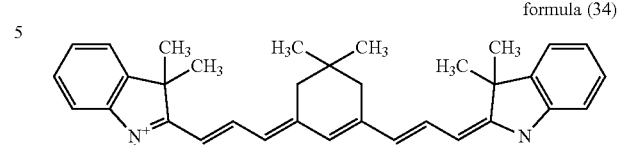
<Chem. 36>
formula (35)
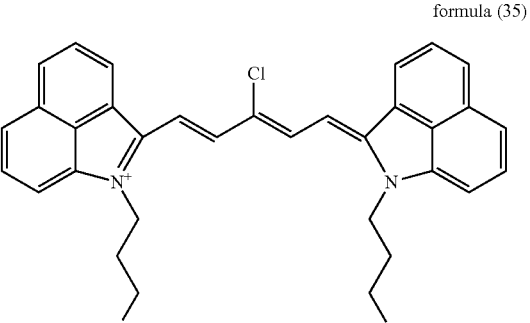
<Chem. 37>
formula (36)
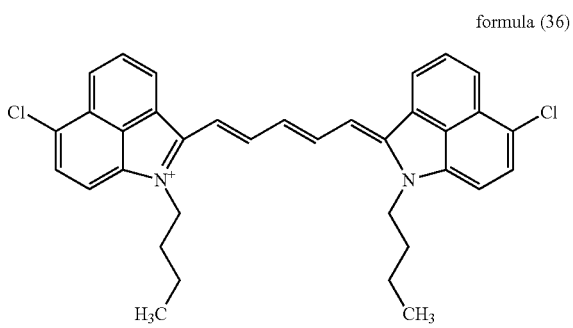
<Chem. 38>
formula (37)
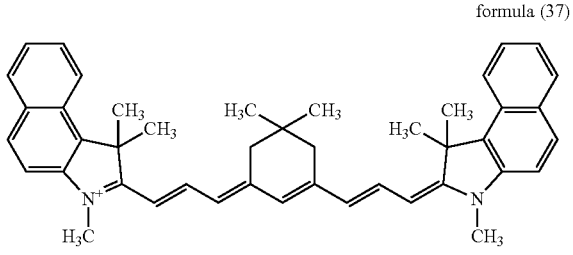
<Chem. 39>
formula (38)
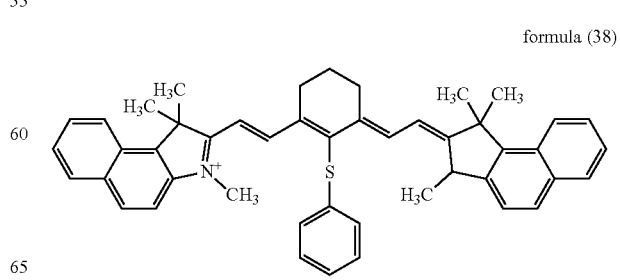

-continued
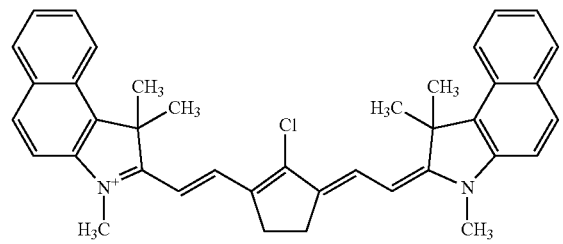
formula (39)
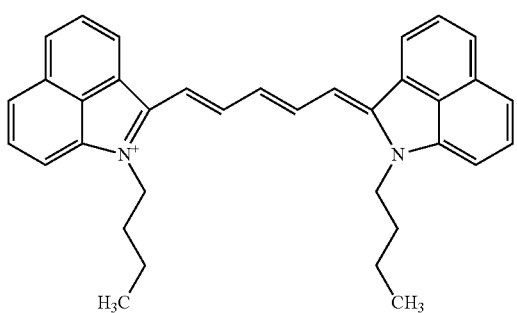
formula (40)
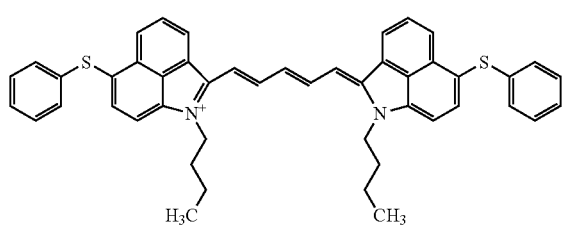
formula (41)
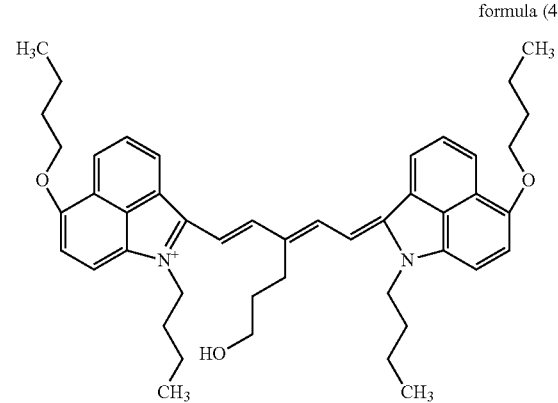
formula (42)
-continued
formula (43)
formula (44)
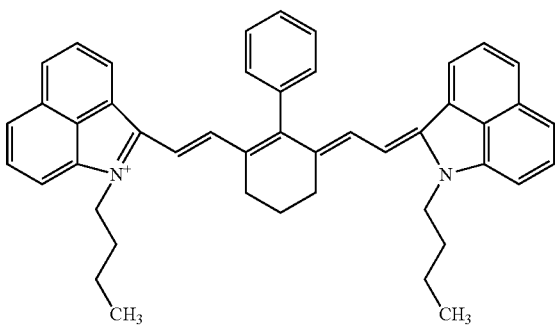
formula (45)
formula (46)

-continued

<Chem. 48>

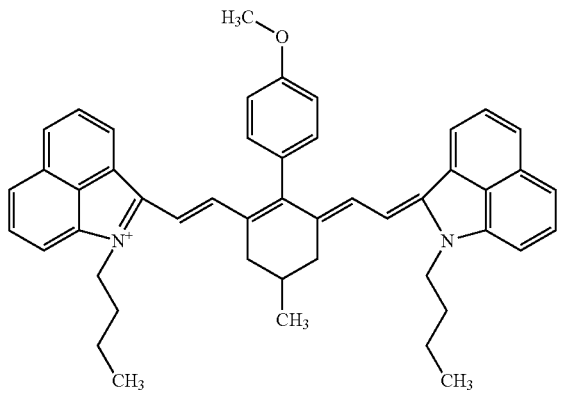

formula (47)

The cyanine dye has an infrared absorbance peak at a wavelength of 700 nm or more and 1100 nm or less. Therefore, near-infrared light passing through the infrared cut-off filter 13 can be reliably absorbed by the infrared cut-off filter 13. Accordingly, the infrared cut-off filter 13 sufficiently cuts off near-infrared light that may otherwise be detected by the respective color photoelectric conversion elements 11.

An absorbance $A\lambda$ at a wavelength $\lambda$ is calculated by the following formula:

$$A\lambda = -\log_{10}(\%T/100)$$

A transmittance T when infrared light passes through the infrared cut-off filter 13 having a cyanine dye is represented by a ratio (TL/IL) of an intensity of transmitted light (TL) to an intensity of incident light (IL). When the intensity of incident light is 1, the intensity of transmitted light of the infrared cut-off filter 13 is the transmittance T, and a value obtained by multiplying the transmittance T by 100 is the transmittance percent % T.

The tris(pentafluoroethyl) trifluorophosphate anion ($[(C_2F_5)_3PF_3]^-$) has a structure represented by the following formula (48).

<Chem. 49>

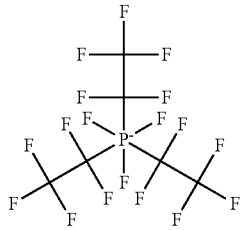

formula (48)

In production of the solid-state image sensor 10, the infrared cut-off filter 13 is heated to approximately 200° C. When heated to approximately 200° C., the above-mentioned cyanine dye changes its structure, which may reduce infrared light absorbance of the cyanine dye.

In this regard, the FAP anion can have a molecular weight and molecular structure capable of being located near a polymethine chain of the cyanine dye. Accordingly, the polymethine chain of the cyanine dye is prevented from being broken when the cyanine dye is heated. Therefore, a decrease in infrared absorbance of the cyanine dye due to the cyanine dye being heated is prevented, and thus a decrease in infrared absorbance of the infrared cut-off filter 13 is prevented.

The acrylic polymer contains an aromatic ring in the side chain. In the acrylic polymer, R1 is a hydrogen atom or a methyl group, R2 is a single bond, a linear alkylene group having 1 or more carbon atoms, a branched alkylene group having 3 or more carbon atoms, or an oxyalkylene group having 1 or more carbon atoms. R2 may be, for example, a methylene group, an ethylene group, a trimethylene group, a propylene group, a butylene group, or the like. In the acrylic polymer, R3 is a hydrogen atom or a predetermined substituent. M is any integer from 1 to 5 when R3 is a substituent. When m is 2 or more, R3 may include only one substituent, or may include two or more substituents. R3 may be bonded to an aromatic ring located between R2 and R3 to form a fused ring. R3 may be, for example, an alkyl group containing a benzene ring. Examples of the alkyl group containing a benzene ring include a benzyl group and 2-phenyl(iso)propyl group. R3 may be, for example, an alkyl group, a haloalkyl group, an alkoxy group, a hydroxyalkyl group, an alkylthio group, an alkylamino group, a dialkylamino group, a cyclic amino group, a halogen atom, an acyl group, an alkoxycarbonyl group, a ureido group, a sulfamoyl group, a carbamoyl group, an alkylcarbamoyl group, an alkylsulfonyl group, an arylsulfonyl group, an alkoxysulfonyl group, an aryloxysulfonyl group, a cyano group, a nitro group, or the like.

The acrylic polymer is a polymer compound obtained by polymerizing monomers containing acrylic acid or methacrylic acid. The monomer containing acrylic acid is an acrylate, and the monomer containing methacrylic acid is a methacrylate.

Examples of the monomer containing an aromatic ring in the acrylic polymer include phenyl methacrylate represented by the following formula (49), biphenyl methacrylate represented by the following formula (50), and benzyl methacrylate ($C_{11}H_{12}O_2$).

<Chem. 50>

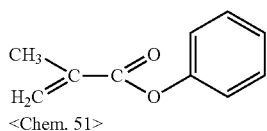

formula (49)

<Chem. 51>

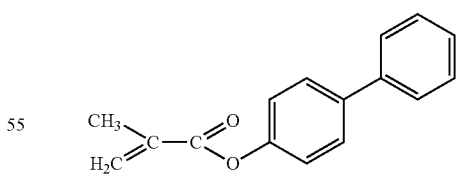

formula (50)

Examples of the monomer containing an aromatic ring in the acrylic polymer further include benzyl (meth)acrylate, phenyl (meth)acrylate, phenoxyethyl (meth)acrylate, phenoxypolyethylene glycol (meth)acrylate, nonylphenoxy polyethylene glycol (meth)acrylate, phenoxypolypropylene glycol (meth)acrylate, 2-(meth)acryloyloxyethyl-2-hydroxypropyl phthalate, 2-hydroxy-3-phenoxypropyl (meth) acrylate, 2-(meth)acryloyl oxyethyl hydrogen phthalate, 2-(meth)acryloyl oxypropyl hydrogen phthalate, ethoxylated ortho-phenyl phenol (meth)acrylate, o-phenyl phenoxyethyl (meth)acrylate, 3-phenoxy benzyl (meth)acrylate, 4-hydroxyphenyl (meth)acrylate, 2-naphthol (meth)acrylate, 4-biphenyl (meth)acrylate, 9-anthrylmethyl (meth)acrylate, 2-[3-(2H-benzotriazole-2-yl)-4-hydroxyphenyl]ethyl (meth) acrylate, phenol ethylene oxide (EO) modified acrylate, nonylphenol EO modified acrylate, 2-(meth)acryloyloxyethyl phthalate, and 2-(meth)acryloyloxyethyl hexahydrophthalate.

In the present embodiment, the acrylic polymer constituting the infrared cut-off filter 13 together with cyanine dye contains an aromatic ring in the side chain. Due to the aromatic ring of the acrylic polymer being located between cyanine dyes adjacent to each other, aggregation between the cyanine dyes is not likely to occur. Thus, occurrence of aggregation between cyanine dyes is suppressed, whereby a decrease in the expected infrared absorbance of the cyanine dye is suppressed. As a result, a decrease in infrared absorbance of the infrared cut-off filter is suppressed.

The acrylic polymer may be a polymer obtained by polymerizing only one of the above acrylic monomers, or may be a copolymer obtained by polymerizing two or more of the above acrylic monomers.

The acrylic polymer may also contain a monomer other than the above acrylic monomers.

Examples of the monomer other than the above acrylic monomers include a styrene monomer, (meth)acrylic monomer, vinyl ester monomer, vinyl ether monomer, halogen-containing vinyl monomer, and diene monomer. The styrene monomer may be, for example, styrene, α-methyl styrene, p-methyl styrene, m-methyl styrene, p-methoxy styrene, p-hydroxy styrene, p-acetoxy styrene, vinyl toluene, ethyl styrene, phenyl styrene, benzyl styrene, or the like. The (meth)acrylic monomer may be, for example, methyl acrylate, ethyl acrylate, butyl acrylate, 2-ethylhexyl acrylate, methyl methacrylate, ethyl methacrylate, butyl methacrylate, 2-ethylhexyl methacrylate, or the like. The vinyl ester monomer may be, for example, vinyl acetate. The vinyl ether monomer may be, for example, vinyl methyl ether. The halogen-containing vinyl monomer may be, for example, vinyl chloride. The diene monomer may be, for example, butadiene, isobutylene, or the like. The acrylic polymer may contain only one of the monomers other than the above acrylic monomers, or may contain two or more of the monomers other than the above acrylic monomers.

Further, the acrylic polymer may also contain a monomer for adjusting the polarity of the acrylic polymer. The monomer for adjusting the polarity adds an acid group or a hydroxyl group to the acrylic polymer. Examples of such a monomer include acrylic acid, methacrylic acid, maleic anhydride, maleic acid half ester, 2-hydroxyethyl acrylate, and 4-hydroxyphenyl (meth)acrylate.

When the acrylic polymer is a copolymer obtained by polymerizing two or more acrylic monomers, the acrylic polymer may have any of structures of random copolymer, alternating copolymer, block copolymer, and graft copolymer. Using an acrylic polymer having a random copolymer structure facilitates production and preparation with a cyanine dye. Therefore, a random copolymer is more preferred than other copolymers.

A polymerization method for obtaining an acrylic polymer may be, for example, radical polymerization, cation polymerization, anion polymerization, living radical polymerization, living cation polymerization, living anion polymerization, or the like. As the polymerization method for obtaining an acrylic polymer, radical polymerization is preferably selected in view of ease of industrial production.

The radical polymerization may be solution polymerization, emulsion polymerization, bulk polymerization, suspension polymerization, or the like. Preferably, solution polymerization is used for the radical polymerization. Using the solution polymerization facilitates control of the molecular weight of the acrylic polymer. Further, a solution containing an acrylic polymer after acrylic monomers are polymerized can be used in a solution state for producing a solid-state image sensor filter.

In the radical polymerization, the above acrylic monomers may be diluted with a polymerization solvent, and then a radical polymerization initiator may be added thereto to perform polymerization of acrylic monomers.

Examples of the polymerization solvent include an ester solvent, an alcohol ether solvent, a ketone solvent, an aromatic solvent, an amide solvent and an alcohol solvent. The ester solvent may be, for example, methyl acetate, ethyl acetate, n-butyl acetate, isobutyl acetate, t-butyl acetate, methyl lactate, ethyl lactate, or the like. The alcohol ether solvent may be, for example, ethylene glycol monomethyl ether, ethylene glycol monoethyl ether, propylene glycol monomethyl ether, propylene glycol monoethyl ether, 3-methoxy-1-butanol, 3-methoxy-3-methyl-1-butanol, or the like. The ketone solvent may be, for example, acetone, methyl ethyl ketone, methyl isobutyl ketone, cyclohexanone, or the like. The aromatic solvent may be, for example, benzene, toluene, xylene, or the like. The amide solvent may be, for example, formamide, dimethylformamide, or the like. The alcohol solvent may be, for example, methanol, ethanol, n-propanol, isopropanol, n-butanol, isobutanol, s-butanol, t-butanol, diacetone alcohol, 2-methyl-2-butanol, or the like. Among these solvents, a ketone solvent and an ester solvent are preferred since they can be used for producing a solid-state image sensor filter. The above polymerization solvents may be used singly or in combination of two or more.

The amount of polymerization solvent used in the radical polymerization is not specifically limited. However, when the total amount of the acrylic monomers is set to 100 parts by weight, the amount of polymerization solvent used is preferably 1 part by weight or more and 1,000 parts by weight or less, and more preferably 10 parts by weight or more and 500 parts by weight or less.

Examples of the radical polymerization initiator include a peroxide and an azo compound. The peroxide may be, for example, benzoyl peroxide, t-butyl peroxyacetate, t-butyl peroxybenzoate, di-t-butyl peroxide, or the like. The azo compound may be, for example, azobisisobutyronitrile, an azobisamidinopropane salt, azobiscyanovaleric acid (salt), 2,2'-azobis[2-methyl-N-(2-hydroxyethyl)propionamide], or the like.

When the total amount of acrylic monomers is set to 100 parts by weight, the amount of radical polymerization initiator used is preferably 0.0001 parts by weight or more and 20 parts by weight or less, more preferably 0.001 parts by weight or more and 15 parts by weight or less, and still more preferably 0.005 parts by weight or more and 10 parts by weight or less. The radical polymerization initiator may be added to the acrylic monomer and the polymerization solvent before the polymerization is started or may be added dropwise in the polymerization reaction system. Adding the radical polymerization initiator dropwise to the acrylic monomer and the polymerization solvent in the polymerization reaction system is preferred since this prevents heat generation due to polymerization.

The reaction temperature of the radical polymerization is appropriately selected depending on the type of the radical polymerization initiator and the polymerization solvent. The reaction temperature is preferably 60° C. or higher and 110° C. or lower from the viewpoint of ease of production and reaction controllability.

The glass transition temperature of the acrylic polymer is preferably 75° C. or higher, and more preferably 100° C. or higher. When the glass transition temperature is 75° C. or higher, it is possible to reliably prevent a decrease in infrared absorbance of the infrared cut-off filter.

The molecular weight of the acrylic polymer is preferably 30,000 or more and 150,000 or less, and more preferably 50,000 or more and 150,000 or less. When the molecular weight of the acrylic polymer is within the above ranges, it is possible to reliably prevent a decrease in infrared absorbance of the infrared cut-off filter. It is difficult to produce a coating liquid containing an acrylic polymer having a molecular weight of more than 150,000 together with the cyanine dye, since the viscosity increases during polymerization. Therefore, when the molecular weight of the acrylic polymer is more than 150,000, it is difficult to produce the infrared cut-off filter 13. On the other hand, when the molecular weight of the acrylic polymer is 150,000 or less, it is possible to prepare a coating liquid containing the acrylic polymer and the cyanine dye. Accordingly, the infrared cut-off filter 13 can be more easily produced. Further, an average molecular weight of the acrylic polymer is a weight average molecular weight. The weight average molecular weight of the acrylic polymer can be measured by, for example, gel permeation chromatography.

The molecular weight of the acrylic polymer can be controlled by, for example, changing the concentration of the acrylic monomer and the radical polymerization initiator in the solution in a radical polymerization reaction.

The percentage (MM/MS×100) of the mass of the acrylic monomer (MM) to the sum of the mass of the acrylic polymer and the mass of the acrylic monomer constituting the acrylic polymer (MS) is preferably 20% or less. Compared with a case where the residual monomer is more than 20%, the infrared absorbance of the cyanine dye is less likely to decrease.

Further, the percentage (MM/MS×100) of the mass of the acrylic monomer (MM) to the sum of the mass of the acrylic polymer and the mass of the acrylic monomer constituting the acrylic polymer (MS) is more preferably 10% or less, and still more preferably 3% or less. The mass of the acrylic polymer and the mass of the acrylic monomer can be determined based on the result of analyzing the acrylic polymer. The acrylic polymer may be analyzed by, for example, gas chromatography-mass spectrometry (GC-MS), nuclear magnetic resonance spectroscopy (NMR), infrared spectroscopy (IR), or the like.

The ratio of the mass of the acrylic monomer to the sum of the mass of the acrylic polymer and the mass of the acrylic monomer may be changed by, for example, changing the polymerization time, changing the polymerization temperature, or the like. Further, the ratio of the mass of the acrylic monomer to the sum of the mass of the acrylic polymer and the mass of the acrylic monomer may also be changed by changing the concentration of the acrylic monomer and the radical polymerization initiator at the start of polymerization reaction. The ratio of the mass of the acrylic monomer to the sum of the mass of the acrylic polymer and the mass of the acrylic monomer may also be changed by changing the refining conditions after polymerization reaction. Particularly, changing the polymerization time is preferred since the change in the ratio of the mass of the acrylic monomer can be controlled with high accuracy.

The infrared cut-off filter 13 can have a thickness of, for example, 300 nm or more and 3 µm or less.

Method for Producing Solid-State Image Sensor Filter

A method for producing the solid-state image sensor filter 10F includes the steps of forming the infrared cut-off filter 13, and patterning the infrared cut-off filter 13 by dry etching. The step of forming the infrared cut-off filter 13 includes forming the infrared cut-off filter 13 containing a cyanine dye and an acrylic polymer having a unit structure represented by the above formula (1). The cyanine dye contains a cation having a polymethine and a nitrogen-containing heterocycle located at each end of the polymethine, and a tris(pentafluoroethyl) trifluorophosphate anion. The method for producing the solid-state image sensor filter 10F will be described in detail below.

The filters 12R, 12G, 12B and 12P are formed by forming a coating film containing a coloring photosensitive resin, and patterning the coating film by photolithography. For example, a coating film containing a red photosensitive resin is formed by applying a coating liquid containing a red photosensitive resin and drying the coating film. The red filter 12R is formed by exposure and development of the coating film containing a red photosensitive resin in a region corresponding to the red filter 12R. The green filter 12G, the blue filter 12B, and the infrared pass filter 12P are also formed by the same manner as for the red filter 12R.

The coloring compositions for the red filter 12R, the green filter 12G, and the blue filter 12B may include organic or inorganic pigments, and these pigments can be used singly or in combination of two or more. Pigments having high color development and high thermal stability, particularly having high resistance to thermal decomposition are preferred. Further, organic pigments are preferred. Examples of the organic pigments include phthalocyanine-based pigments, azo-based pigments, anthraquinone-based pigments, quinacridone-based pigments, dioxazine-based pigments, anthanthrone-based pigments, indanthrone-based pigments, perylene-based pigments, thioindigo-based pigments, isoindoline-based pigments, quinophthalone-based pigments, and diketopyrrolopyrrole-based pigment. Further, a coloring component contained in the infrared pass filter 12P may be a black colorant or a black dye. The black colorant may be a single colorant producing black, or a mixture of two or more colorants producing black. Examples of black dyes include azo-based dyes, anthraquinone-based dyes, azine-based dyes, quinoline-based dyes, perinone-based dyes, perylene-based dyes, and methine-based dyes. The photosensitive coloring composition for each color further contains a binder resin, a photopolymerization initiator, a polymerizable monomer, an organic solvent, a leveling agent, and the like.

The infrared cut-off filter 13 is formed by applying a coating liquid containing the above cyanine dye, the acrylic polymer having an aromatic ring in the side chain, and the organic solvent to each of the filters 12R, 12G, 12B and 12P, and drying the coating film. Then, the dried coating film is thermally cured by post baking. Thus, the infrared cut-off filter 13 is formed.

In formation of the through hole 13H of the infrared cut-off filter 13, a photoresist layer is first formed on the infrared cut-off filter 13. The photoresist layer is removed in a pattern to form a resist pattern. That is, a resist pattern is formed from the photoresist layer by removing a part of the photoresist layer. Next, the infrared cut-off filter 13 is etched by dry etching using the resist pattern as an etching mask. The resist pattern left on the infrared cut-off filter 13 after etching is then removed to form a through hole 13H. Thus, the infrared cut-off filter 13 is patterned.

The barrier layer 14 is formed by film formation using a vapor phase film formation method such as sputtering, CVD, or ion plating, or a liquid phase film formation method such as coating. A barrier layer 14 made of a silicon oxide may be formed by, for example, forming a film by sputtering using a target made of silicon oxide on a substrate on which the infrared cut-off filter 13 is formed. The barrier layer 14 made of a silicon oxide may be formed by, for example, forming a film by CVD using silane and oxygen on a substrate on which the infrared cut-off filter 13 is formed. The barrier layer 14 made of a silicon oxide may be formed by, for example, applying a coating liquid containing a polysilazane, modifying, and drying the coating film. The layer structure of the barrier layer 14 may be a single-layer structure made of a single compound, a laminate structure composed of layers made of a single compound, or a laminate structure composed of layers made of compounds different from each other.

The microlenses 15R, 15G, 15B and 15P are formed by forming a coating film containing a transparent resin, patterning the coating film by photolithography, and performing reflow by heat treatment. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin.

PREPARATION EXAMPLES OF ACRYLIC POLYMER

Preparation Example 1

60 parts by weight of propylene glycol monomethyl ether acetate (PGMAc) was prepared as a polymerization solvent, 40 parts by weight of phenyl methacrylate ($C_{10}H_{10}O_2$) was prepared as an acrylic monomer, and 0.60 parts by weight of benzoyl peroxide (BPO) was prepared as a radical polymerization initiator. These were placed in a reaction vessel having a stirring device and a reflux tube, and then stirred and refluxed for 8 hours while being heated to 80° C. with nitrogen gas being introduced into the reaction vessel. Thus, a homopolymer solution of phenyl methacrylate was obtained. An extrapolated glass transition onset temperature of the polymer thus formed was measured by a method according to JIS K 7121. The extrapolated glass transition onset temperature was found to be 113° C.

Preparation Example 2

80 parts by weight of PGMAc was prepared as a polymerization solvent, 20 parts by weight of methyl methacrylate ($C_5H_8O_2$) was prepared as an acrylic monomer, and 0.48 parts by weight of BPO was prepared as a radical polymerization initiator. A homopolymer solution of methyl methacrylate was obtained in the same manner as in Preparation Example 1. An extrapolated glass transition onset temperature of the polymer thus formed was measured by a method according to JIS K 7121. The extrapolated glass transition onset temperature was found to be 105° C.

Preparation Example 3

The acrylic monomer, the polymerization solvent, and the radical polymerization initiator in Preparation Example 1 were changed as shown in Table 1 to obtain acrylic polymers of Preparation Example 3-1 to Preparation Example 3-9. Further, an extrapolated glass transition onset temperature of the acrylic polymer was measured.

TABLE 1

| Preparation example | Acrylic monomer 1 | Acrylic monomer 2 | Acrylic monomer 1 (parts by weight) | Acrylic monomer 2 (parts by weight) | BPO | PGMAc | Tg (° C.) |
|---|---|---|---|---|---|---|---|
| 3-1 | Phenyl methacrylate | — | 40 | — | 0.60 | 60 | 113 |
| 3-2 | Phenyl methacrylate | Methyl methacrylate | 10 | 10 | 0.39 | 80 | 109 |
| 3-3 | 4-biphenyl methacrylate | — | 20 | — | 0.20 | 80 | 125 |
| 3-4 | 2-[3-(2H-benzotriazole-2-yl)-4-hydroxyphenyl] ethyl methacrylate | Methyl methacrylate | 10 | 10 | 0.32 | 80 | 85 |
| 3-5 | Benzyl methacrylate | Methyl methacrylate | 10 | 10 | 0.38 | 80 | 77 |
| 3-6 | Benzyl methacrylate | — | 20 | — | 0.28 | 80 | 54 |
| 3-7 | 4-phenyl phenoxy ethyl acrylate | Methyl methacrylate | 10 | 10 | 0.33 | 80 | 49 |
| 3-8 | 2-phenoxy ethyl acrylate | Methyl methacrylate | 10 | 10 | 0.37 | 80 | 29 |
| 3-9 | 3-phenoxy benzyl acrylate | Methyl methacrylate | 10 | 10 | 0.34 | 80 | 19 |

Preparation Example 3-1

A homopolymer solution of phenyl methacrylate was obtained in the same manner as in Preparation Example 1.

Preparation Example 3-2

80 parts by weight of PGMAc was prepared as a polymerization solvent, 10 parts by weight of phenyl methacrylate and 10 parts by weight of methyl methacrylate were prepared as acrylic monomers, and 0.39 parts by weight of BPO was prepared as a radical polymerization initiator. A polymer solution containing a copolymer of phenyl methacrylate and a methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 109° C.

Preparation Example 3-3

80 parts by weight of PGMAc was prepared as a polymerization solvent, 20 parts by weight of 4-biphenyl methacrylate ($C_6H_{14}O_2$) was prepared as an acrylic monomer, and 0.20 parts by weight of BPO was prepared as a radical polymerization initiator. A homopolymer solution of 4-biphenyl methacrylate was obtained in the same manner as in Preparation Example 1. An extrapolated glass transition onset temperature of the polymer thus formed was calculated by a method according to JIS K 7121. The extrapolated glass transition onset temperature was found to be 125° C.

Preparation Example 3-4

80 parts by weight of PGMAc was prepared as a polymerization solvent, 10 parts by weight of 2-[3-(2H-benzotriazole-2-yl)-4-hydroxyphenyl] ethyl methacrylate ($C_{18}H_{17}N_3O_3$) and 10 parts by weight of methyl methacrylate were prepared as acrylic monomers, and 0.32 parts by weight of BPO was prepared as a radical polymerization initiator. A polymer solution containing a copolymer of 2-[3-(2H-benzotriazole-2-yl)-4-hydroxyphenyl] ethyl methacrylate and methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 85° C.

Preparation Example 3-5

80 parts by weight of PGMAc was prepared as a polymerization solvent, 10 parts by weight of benzyl methacrylate ($C_{11}H_{12}O_2$) and 10 parts by weight of methyl methacrylate were prepared as acrylic monomers, and 0.38 parts by weight of BPO was prepared as a radical polymerization initiator. A polymer solution containing a copolymer of benzyl methacrylate and methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 77° C.

Preparation Example 3-6

80 parts by weight of PGMAc was prepared as a polymerization solvent, 20 parts by weight of benzyl methacrylate was prepared as an acrylic monomer, and 0.28 parts by weight of BPO was prepared as a radical polymerization initiator. A homopolymer solution of benzyl methacrylate was obtained in the same manner as in Preparation Example 1. An extrapolated glass transition onset temperature of the polymer thus formed was calculated by a method according to JIS K 7121. The extrapolated glass transition onset temperature was found to be 54° C.

Preparation Example 3-7

80 parts by weight of PGMAc was prepared as a polymerization solvent, 10 parts by weight of 4-phenyl phenoxy ethyl acrylate ($C_{17}H_{16}O_3$) and 10 parts by weight of methyl methacrylate were prepared as acrylic monomers, and 0.33 parts by weight of BPO was prepared as a radical polymerization initiator. A polymer solution containing a copolymer of 4-phenyl phenoxy ethyl acrylate and methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 49° C.

Preparation Example 3-8

80 parts by weight of PGMAc was prepared as a polymerization solvent, 10 parts by weight of 2-phenoxy ethyl acrylate ($C_{11}H_{12}O_3$) and 10 parts by weight of methyl methacrylate were prepared as acrylic monomers, and 0.37 parts by weight of BPO was prepared as a radical polymerization initiator. A polymer solution containing a copolymer of 2-phenoxy ethyl acrylate and methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 29° C.

Preparation Example 3-9

80 parts by weight of PGMAc was prepared as a polymerization solvent, 10 parts by weight of 3-phenoxy benzyl acrylate ($C_{16}H_{14}O_3$) and 10 parts by weight of methyl methacrylate were prepared as acrylic monomers, and 0.34 parts by weight of BPO was prepared as a radical polymerization initiator. A polymer solution containing a copolymer of 3-phenoxy benzyl acrylate and methyl methacrylate was obtained in the same manner as in Preparation Example 1. An extrapolated glass transition onset temperature of the copolymer thus formed was calculated by a method according to JIS K 7121. The extrapolated glass transition onset temperature was found to be 19° C.

Preparation Example 4

The amount of acrylic monomer, radical polymerization initiator and polymerization solvent used, and the polymerization time in Preparation Example 1 were changed as shown in Table 2 to obtain acrylic polymers of Preparation Example 4-1 to Preparation Example 4-6. Further, the acrylic polymer was analyzed using 1H-NMR (400 MHz) to calculate a residual amount of acrylic monomer (RM) represented by the following formula.

$$RM = MM/MS \times 100$$

where MM is the area ratio of the peak of the acrylic monomer in the NMR spectrum of the acrylic polymer, and MS is the sum of the area ratio of the peak of the acrylic polymer and the peak of the acrylic monomer in the NMR spectrum of the acrylic polymer

TABLE 2

| Preparation example | Amount used (parts by weight) | | | Polymerization time (hours) | Residual amount of monomer (%) |
| --- | --- | --- | --- | --- | --- |
| | Phenyl methacrylate | BPO | PGMAc | | |
| 4-1 | 40 | 0.60 | 60 | 8 | 3 |
| 4-2 | 40 | 0.60 | 60 | 7 | 10 |
| 4-3 | 40 | 0.60 | 60 | 6 | 20 |
| 4-4 | 40 | 0.60 | 60 | 5 | 25 |

TABLE 2-continued

| Preparation example | Amount used (parts by weight) | | | Polymerization time (hours) | Residual amount of monomer (%) |
|---|---|---|---|---|---|
| | Phenyl methacrylate | BPO | PGMAc | | |
| 4-5 | 20 | 0.30 | 80 | 10 | 30 |
| 4-6 | 20 | 0.30 | 80 | 8 | 45 |

Preparation Example 4-1

A homopolymer solution of phenyl methacrylate was obtained in the same manner as in Preparation Example 1. A residual amount of monomer in the homopolymer solution was calculated by analysis using 1H-NMR (400 MHz). The residual amount of monomer (RM) was found to be 3%.

Preparation Example 4-2

A homopolymer solution of phenyl methacrylate was obtained in the same manner as in Preparation Example 4-1 except that the polymerization time was changed to 7 hours. A residual amount of monomer in the homopolymer solution was calculated by analysis using 1H-NMR (400 MHz). The residual amount of monomer (RM) was found to be 10%.

Preparation Example 4-3

A homopolymer solution of phenyl methacrylate was obtained in the same manner as in Preparation Example 4-1 except that the polymerization time was changed to 6 hours. A residual amount of monomer in the homopolymer solution was calculated by analysis using 1H-NMR (400 MHz). The residual amount of monomer (RM) was found to be 20%.

Preparation Example 4-4

A homopolymer solution of phenyl methacrylate was obtained in the same manner as in Preparation Example 4-1 except that the polymerization time was changed to 5 hours. A residual amount of monomer in the homopolymer solution was calculated by analysis using 1H-NMR (400 MHz). The residual amount of monomer (RM) was found to be 25%.

Preparation Example 4-5

80 parts by weight of PGMAc was prepared as a polymerization solvent, 20 parts by weight of phenyl methacrylate was prepared as an acrylic monomer, and 0.30 parts by weight of BPO was prepared as a radical polymerization initiator. A homopolymer solution of phenyl methacrylate was obtained in the same manner as in Preparation Example 4-1 except that the polymerization time was changed to 10 hours. A residual amount of monomer in the homopolymer solution was calculated by analysis using 1H-NMR (400 MHz). The residual amount of monomer (RM) was found to be 30%.

Preparation Example 4-6

A homopolymer solution of phenyl methacrylate was obtained in the same manner as in Preparation Example 4-5 except that the polymerization time was changed to 8 hours. A residual amount of monomer in the homopolymer solution was calculated by analysis using 1H-NMR (400 MHz). The residual amount of monomer (RM) was found to be 45%.

Preparation Example 5

The amount of acrylic monomer, polymerization solvent and radical polymerization initiator used in Preparation Example 1 were changed as shown in Table 3 to obtain acrylic polymers of Preparation Example 5-1 to Preparation Example 5-5. Further, a weight average molecular weight of the acrylic polymer was calculated by analysis using gel permeation chromatography.

TABLE 3

| Preparation example | Amount used (parts by weight) | | | Weight average molecular weight (k) |
|---|---|---|---|---|
| | Phenyl methacrylate | BPO | PGMAc | |
| 5-1 | 10 | 0.60 | 90 | 5 |
| 5-2 | 10 | 1.20 | 90 | 10 |
| 5-3 | 20 | 0.60 | 80 | 30 |
| 5-4 | 40 | 1.20 | 60 | 50 |
| 5-5 | 40 | 0.15 | 60 | 100 |

Preparation Example 5-1

90 parts by weight of PGMAc was prepared as a polymerization solvent, 10 parts by weight of phenyl methacrylate was prepared as an acrylic monomer, and 0.60 parts by weight of BPO was prepared as a radical polymerization initiator. A homopolymer solution of phenyl methacrylate was obtained in the same manner as in Preparation Example 1. A weight average molecular weight of the acrylic polymer was calculated by analysis using gel permeation chromatography. The weight average molecular weight of the acrylic polymer was found to be 5,000.

Preparation Example 5-2

A homopolymer solution of phenyl methacrylate was obtained in the same manner as in Preparation Example 5-1 except that 1.20 parts by weight of BPO was prepared as a radical polymerization initiator. A weight average molecular weight of the acrylic polymer was calculated by analysis using gel permeation chromatography. The weight average molecular weight of the acrylic polymer was found to be 10,000.

Preparation Example 5-3

A homopolymer solution of phenyl methacrylate was obtained in the same manner as in Preparation Example 5-1 except that 20 parts by weight of phenyl methacrylate was prepared as an acrylic monomer, and 80 parts by weight of PGMAc was prepared as a polymerization solvent. A weight average molecular weight of the acrylic polymer was calculated by analysis using gel permeation chromatography. The weight average molecular weight of the acrylic polymer was found to be 30,000.

Preparation Example 5-4

60 parts by weight of PGMAc was prepared as a polymerization solvent, 40 parts by weight of phenyl methacrylate was prepared as an acrylic monomer, and 1.20 parts by weight of BPO was prepared as a radical polymerization initiator. A homopolymer solution of phenyl methacrylate was obtained in the same manner as in Preparation Example 5-1. A weight average molecular weight of the acrylic polymer was calculated by analysis using gel permeation chromatography. The weight average molecular weight of the acrylic polymer was found to be 50,000.

Preparation Example 5-5

A homopolymer solution of phenyl methacrylate was obtained in the same manner as in Preparation Example 5-4 except that 0.15 parts by weight of BPO was prepared as a radical polymerization initiator. A weight average molecular weight of the acrylic polymer was calculated by analysis using gel permeation chromatography. The weight average molecular weight of the acrylic polymer was found to be 100,000.

TEST EXAMPLES

Side Chain of Acrylic Polymer

Test Example 1

A coating liquid containing 0.3 g of cyanine dye, 12 g of a 25% homopolymer solution of phenyl methacrylate, and 10 g of propylene glycol monomethyl ether acetate was prepared. The cyanine dye used was the dye represented by the above formula (6), and the homopolymer solution used was the homopolymer solution of Preparation Example 1. The coating liquid was applied to the transparent substrate, and the coating film was dried. The coating film was then thermally cured by post baking at 230° C. to obtain an infrared cut-off filter of Test Example 1 having 1 μm thickness.

Test Example 2

An infrared cut-off filter of Test Example 2 was obtained in the same manner as in Test Example 1 except that a homopolymer solution of methyl methacrylate described in Preparation Example 2 was used instead of the homopolymer solution of phenyl methacrylate in Test Example 1.

Evaluation Method

A transmittance of the infrared cut-off filter for light with a wavelength of 350 nm to 1150 nm was measured using a spectrophotometer (U-4100, manufactured by Hitachi High-Technologies Corporation). From the measurement result of the transmittance, an absorbance was calculated. Thus, an absorbance spectrum of each infrared cut-off filter was obtained. The absorbance spectrum of the cyanine dye represented by the above formula (6) has a peak at 950 nm. Therefore, it was determined whether the absorbance at 950 nm of each infrared cut-off filter was 0.8 or more. An infrared cut-off filter having the absorbance at 950 nm of 0.8 or more has an infrared light absorption ability suitable for use in a solid-state image sensor.

Evaluation Results

The absorbance at 950 nm of the infrared cut-off filter of Test Example 1 was found to be 0.92, which is larger than 0.8. On the other hand, the absorbance of the infrared cut-off filter of Test Example 2 was found to be 0.5, which is smaller than 0.8. Accordingly, the comparison between the infrared cut-off filter of Test Example 1 and the infrared cut-off filter of Test Example 2 found that a decrease in absorbance of the infrared cut-off filter was suppressed due to the acrylic monomer constituting the infrared cut-off filter having an aromatic ring. The reason for this seems to be that the aromatic ring located in the side chain of the acrylic polymer in the infrared cut-off filter of Test Example 1 is located between a cyanine dye and another cyanine dye, whereby a distance sufficient to prevent occurrence of aggregation between cyanine dyes is formed between the cyanine dyes.

Glass Transition Temperature of Acrylic Polymer

Test Example 3

Acrylic polymers of Preparation Example 3-1 to Preparation Example 3-9, each having an aromatic ring and a different glass transition temperature of the polymer, were prepared. Then, a coating liquid containing 0.3 g of cyanine dye, 12 g of a 25% polymer solution, and 10 g of propylene glycol monomethyl ether acetate was prepared. The cyanine dye used was the cyanine dye represented by the above formula (6). Infrared cut-off filters of Test Example 3-1 to Test Example 3-9 were obtained by forming an infrared cut-off filter in the same manner as in Test Example 1. The infrared cut-off filter of each test example thus obtained had a 1 μm thickness.

Evaluation Method

The infrared absorbance of the infrared cut-off filters of Test Example 3-1 to Test Example 3-9 was evaluated by the same evaluation method as that performed for the infrared cut-off filter of Test Example 1 and the infrared cut-off filter of Test Example 2.

Evaluation Results

Table 4 below shows the absorbance at 950 nm of the infrared cut-off filters of Test Example 3-1 to Test Example 3-9.

TABLE 4

| Test example | Absorbance |
|---|---|
| 3-1 | 0.92 |
| 3-2 | 0.92 |
| 3-3 | 0.98 |
| 3-4 | 1.00 |
| 3-5 | 0.85 |
| 3-6 | 0.75 |
| 3-7 | 0.61 |
| 3-8 | 0.60 |
| 3-9 | 0.58 |

As seen from Table 4, the absorbance of Test Example 3-1 was 0.92, the absorbance of Test Example 3-2 was 0.92, and the absorbance of Test Example 3-3 was 0.98. Further, the absorbance of Test Example 3-4 was 1.00, the absorbance of Test Example 3-5 was 0.85, and the absorbance of Test Example 3-6 was 0.75. Further, the absorbance of Test Example 3-7 was 0.61, the absorbance of Test Example 3-8 was 0.60, and the absorbance of Test Example 3-9 was 0.58. As described above, the absorbance at 950 nm in each infrared cut-off filter was calculated, and the absorbance of the infrared cut-off filters of Test Example 3-1 to Test Example 3-5 was found to be 0.8 or more. On the other hand, the absorbance of the infrared cut-off filters of Test Example 3-6 to Test Example 3-9 was found to be less than 0.8. From the above results, the glass transition temperature of the acrylic polymer in the infrared cut-off filter is found to be preferably 75° C. or higher.

Residual Amount of Acrylic Monomer

Test Example 4

Acrylic polymers of Preparation Example 4-1 to Preparation Example 4-6, each having an aromatic ring and a different residual monomer amount of the polymer, were prepared. Then, a coating liquid containing 0.3 g of cyanine dye, 12 g of a 25% polymer solution, and 10 g of propylene glycol monomethyl ether acetate was prepared. The cyanine dye represented by the above formula (6) was used. The coating liquid was applied to the transparent substrate, and the coating film was dried. The coating film was then thermally cured by post baking at 230° C. to obtain infrared cut-off filters of Test Example 4-1 to Test Example 4-6. The infrared cut-off filter of each test example thus obtained had a 1 µm thickness.

Evaluation Method

The infrared absorbance of the infrared cut-off filters of Test Example 4-1 to Test Example 4-6 was evaluated by the same evaluation method as that performed for the infrared cut-off filter of Test Example 1 and the infrared cut-off filter of Test Example 2.

Evaluation Results

Table 5 below shows the absorbance at 950 nm of the infrared cut-off filters of Test Example 4-1 to Test Example 4-6.

TABLE 5

| Test example | Absorbance |
|---|---|
| 4-1 | 0.92 |
| 4-2 | 0.91 |
| 4-3 | 0.88 |
| 4-4 | 0.78 |
| 4-5 | 0.75 |
| 4-6 | 0.73 |

As seen from Table 5, the absorbance of Test Example 4-1 was 0.92, the absorbance of Test Example 4-2 was 0.91, and the absorbance of Test Example 4-3 was 0.88. Further, the absorbance of Test Example 4-4 was 0.78, the absorbance of Test Example 4-5 was 0.75, and the absorbance of Test Example 4-6 was 0.73.

As described above, in the infrared cut-off filters of Test Example 4-1 to Test Example 4-3, the absorbance at 950 nm was found to be 0.8 or more. On the other hand, in the infrared cut-off filters of Test Example 4-4 to Test Example 4-6, the absorbance at 950 nm was found to be less than 0.8. From the above results, the residual amount of monomer in the infrared cut-off filter is found to be preferably 20% or less.

Average Molecular Weight of Acrylic Monomer

Test Example 5

Acrylic polymers of Preparation Example 5-1 to Preparation Example 5-5, each having an aromatic ring and a different weight average molecular weight of the polymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). The coating liquid was applied to the transparent substrate, and the coating film was dried. The coating film was then thermally cured by post baking at 230° C. to obtain infrared cut-off filters of Test Example 5-1 to Test Example 5-5. The infrared cut-off filter of each test example thus obtained had a 1 µm thickness.

Evaluation Method

The infrared absorbance of the infrared cut-off filters of Test Example 5-1 to Test Example 5-5 was evaluated by the same evaluation method as that performed for the infrared cut-off filter of Test Example 1 and the infrared cut-off filter of Test Example 2.

Evaluation Results

Table 6 below shows the absorbance at 950 nm of the infrared cut-off filters of Test Example 5-1 to Test Example 5-5.

TABLE 6

| Test example | Absorbance |
|---|---|
| 5-1 | 0.78 |
| 5-2 | 0.79 |
| 5-3 | 0.92 |
| 5-4 | 0.95 |
| 5-5 | 0.98 |

As seen from Table 6, the absorbance of Test Example 5-1 was 0.78, the absorbance of Test Example 5-2 was 0.79, and the absorbance of Test Example 5-3 was 0.92. Further, the absorbance of Test Example 5-4 was 0.95, and the absorbance of Test Example 5-5 was 0.98.

As described above, in the infrared cut-off filters of Test Example 5-1 and Test Example 5-2, the absorbance at 950 nm was found to be less than 0.8. On the other hand, in the infrared cut-off filters of Test Example 5-3 to Test Example 5-5, the absorbance at 950 nm was found to be 0.8 or more. From the above results, the average molecular weight of acrylic polymer in the infrared cut-off filter is found to be preferably 30,000 or more.

As described above, according to an embodiment of the infrared cut-off filter, the solid-state image sensor filter, the solid-state image sensor, and the method for producing a solid-state image sensor filter, the following advantageous effects can be obtained.

(1-1) Since the aromatic ring of the acrylic polymer is located between cyanine dyes adjacent to each other, a distance sufficient to prevent occurrence of aggregation between cyanine dyes can be formed between the cyanine dyes. This prevents a decrease in absorbance at the expected absorption wavelength of the cyanine dye. Accordingly, a decrease in infrared absorbance of the infrared cut-off filter 13 can be suppressed.

(1-2) Since the glass transition temperature of the acrylic polymer is 75° C. or higher, it is possible to reliably prevent a decrease in infrared absorbance of the infrared cut-off filter 13.

(1-3) Since the molecular weight of the acrylic polymer is 30,000 or more and 150,000 or less, it is possible to reliably prevent a decrease in infrared absorbance of the infrared cut-off filter 13.

(1-4) Since the residual monomer is 20% or less, the infrared absorbance of the infrared cut-off filter 13 is less likely to decrease compared with a case where the residual monomer is more than 20%.

(1-5) The barrier layer 14 prevents an oxidation source from reaching the infrared cut-off filter 13, whereby oxidation of the infrared cut-off filter 13 by the oxidation source is suppressed. Accordingly, it is possible to improve the light resistance of the infrared cut-off filter 13.

Second Embodiment

A second embodiment of an infrared cut-off filter, a solid-state image sensor filter, a solid-state image sensor, and a method for producing a solid-state image sensor filter will be described. In the infrared cut-off filter of the second embodiment, a unit structure necessary for the acrylic polymer in the infrared cut-off filter is different from that of the acrylic polymer in the infrared cut-off filter of the first embodiment. Therefore, the following description will be given of the details of the acrylic polymer which is different between the embodiments.

Infrared Cut-Off Filter

The infrared cut-off filter 13 will be described in more detail below.

The infrared cut-off filter 13 includes: a cyanine dye containing a cation having a polymethine and a nitrogen-containing heterocycle located at each end of the polymethine, and a tris(pentafluoroethyl) trifluorophosphate (FAP) anion; and an acrylic polymer having a unit structure represented by the following formula (2).

The cyanine dye contains a cation and an anion. In the present embodiment, the cyanine dye contains a cation as a compound containing a nitrogen atom, and an FAP anion.

<Chem. 52>

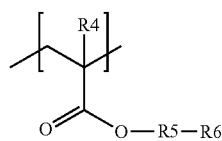

formula (2)

In the above formula (2), R4 is a hydrogen atom or a methyl group. R5 is a single bond, a linear alkylene group having 1 or more carbon atoms, a branched alkylene group having 3 or more carbon atoms, or an oxyalkylene group having 1 or more carbon atoms. R6 is an alicyclic structure having 3 or more carbon atoms.

The cyanine dye contained in the infrared cut-off filter 13 may be the cyanine dye described in the first embodiment.

The acrylic polymer contains an alicyclic structure in the side chain. The alicyclic structure includes a structure that does not contain an aromatic ring formed of a monocyclic ring or a polycyclic ring such as a condensed ring or bridged ring. In the acrylic polymer, R4 is a hydrogen atom or a methyl group, R5 is a single bond, a linear alkylene group having 1 or more carbon atoms, a branched alkylene group having 3 or more carbon atoms, or an oxyalkylene group having 1 or more carbon atoms. R5 may be, for example, a methylene group, an ethylene group, a trimethylene group, a propylene group, a butylene group, or the like. In the acrylic polymer, R6 is an alicyclic structure having 3 or more carbon atoms. The alicyclic structure may be a saturated alicyclic structure containing only a single bond or may be an unsaturated alicyclic structure containing at least one of a double bond and a triple bond.

Examples of the alicyclic structure include a cyclohexyl skeleton, a dicyclopentadiene skeleton, an adamantane skeleton, a norbornane skeleton, an isobornane skeleton, a cycloalkane skeleton, a cycloalkene skeleton, a norbornene skeleton, a norbornadiene skeleton, a tricycloalkane skeleton, a tetracycloalkane skeleton, a polycyclic skeleton, and a spiro skeleton.

The cycloalkane skeleton may be, for example, a cyclopropane skeleton, a cyclobutane skeleton, a cyclopentane skeleton, a cyclohexane skeleton, a cycloheptane skeleton, a cyclooctane skeleton, a cyclononane skeleton, a cyclodecane skeleton, a cycloundecane skeleton, a cyclododecane skeleton, or the like. The cycloalkene skeleton may be, for example, a cyclopropene skeleton, a cyclobutene skeleton, a cyclopentene skeleton, a cyclohexene skeleton, a cycloheptene skeleton, a cyclooctene skeleton, or the like. The tricycloalkane skeleton may be, for example, a tricyclodecane skeleton, or the like. The tetracycloalkane skeleton may be, for example, a tetracyclododecane skeleton, or the like. The polycyclic skeleton may be, for example, a cubane skeleton, a basketane skeleton, a hausane skeleton, or the like.

The acrylic polymer is a polymer compound obtained by polymerizing monomers containing acrylic acid or methacrylic acid. The monomer containing acrylic acid is an acrylate, and the monomer containing methacrylic acid is a methacrylate.

Examples of the monomer containing an alicyclic structure in the acrylic polymer include isobornyl acrylate ($C_{13}H_{20}O_2$) represented by the following formula (51), and dicyclopentanyl methacrylate ($C_{14}H_{20}O_2$) represented by the following formula (52).

<Chem. 53>

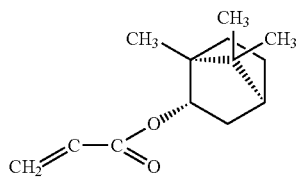

formula (51)

<Chem. 54>

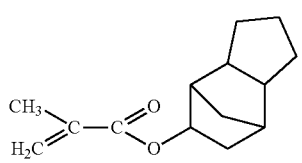

formula (52)

Examples of the monomer containing an alicyclic structure in the acrylic polymer further include cyclopentyl (meth)acrylate, cyclohexyl (meth)acrylate, 4-t-cyclohexyl (meth)acrylate, isobornyl methacrylate, dicyclopentanyl acrylate, dicyclopentenyl (meth)acrylate, adamantyl (meth)

acrylate, norbornyl (meth)acrylate, tricyclodecanyl (meth) acrylate, dicyclopentadienyl (meth)acrylate, and tetracyclododecyl (meth)acrylate.

In the present embodiment, the acrylic polymer constituting the infrared cut-off filter 13 together with cyanine dye contains an alicyclic structure in the side chain. Due to the alicyclic structure of the acrylic polymer being located between cyanine dyes adjacent to each other, aggregation between the cyanine dyes is not likely to occur. Therefore, a decrease in the expected infrared absorbance of the cyanine dye caused by aggregation between cyanine dyes is suppressed. As a result, a decrease in infrared absorbance of the infrared cut-off filter is suppressed.

The acrylic polymer may be a polymer obtained by polymerizing only one of the above acrylic monomers, or may be a copolymer obtained by polymerizing two or more of the above acrylic monomers.

The acrylic polymer may also contain a monomer other than the above acrylic monomers.

Examples of the monomer other than the above acrylic monomers include monomers listed in the first embodiment. Further, as with the acrylic polymer in the first embodiment, the acrylic polymer may also contain a monomer for adjusting the polarity of the acrylic polymer. When the acrylic polymer is a copolymer obtained by polymerizing two or more acrylic monomers, the acrylic copolymer may have any of the structures listed in the first embodiment.

A polymerization method for obtaining an acrylic polymer may be any of the polymerization methods described in the first embodiment.

The glass transition temperature of the acrylic polymer is preferably 75° C. or higher, and more preferably 100° C. or higher as with the acrylic polymer in the first embodiment. When the glass transition temperature is 75° C. or higher, it is possible to reliably prevent a decrease in infrared absorbance of the infrared cut-off filter.

The molecular weight of the acrylic polymer is preferably 30,000 or more and 150,000 or less, and more preferably 50,000 or more and 150,000 or less as in the first embodiment. When the molecular weight of the acrylic polymer is within the above ranges, it is possible to reliably prevent a decrease in infrared absorbance of the infrared cut-off filter. It is difficult to produce a coating liquid containing an acrylic polymer having a molecular weight of more than 150,000 together with the cyanine dye, since the viscosity increases during polymerization. Therefore, when the molecular weight of the acrylic polymer is more than 150,000, it is difficult to produce the infrared cut-off filter 13. On the other hand, when the molecular weight of the acrylic polymer is 150,000 or less, it is possible to prepare a coating liquid containing the acrylic polymer and the cyanine dye. Accordingly, the infrared cut-off filter 13 can be more easily produced.

The percentage (MM/MS×100) of the mass of the acrylic monomer (MM) to the sum of the mass of the acrylic polymer and the mass of the acrylic monomer constituting the acrylic polymer (MS) is preferably 20% or less as in the first embodiment. Compared with a case where the residual monomer is more than 20%, the infrared absorbance of the cyanine dye is less likely to decrease.

Further, the percentage (MM/MS×100) of the mass of the acrylic monomer (MM) to the sum of the mass of the acrylic polymer and the mass of the acrylic monomer constituting the acrylic polymer (MS) is more preferably 10% or less, and still more preferably 3% or less.

The infrared cut-off filter 13 can have a thickness of, for example, 300 nm or more and 3 μm or less.

Method for Producing Solid-State Image Sensor Filter

A method for producing the solid-state image sensor filter 10F includes the steps of forming the infrared cut-off filter 13, and patterning the infrared cut-off filter 13 by dry etching. The step of forming the infrared cut-off filter 13 includes forming the infrared cut-off filter 13 containing a cyanine dye and an acrylic polymer having a unit structure represented by the above formula (2). The cyanine dye contains a cation having a polymethine and a nitrogen-containing heterocycle located at each end of the polymethine, and a tris(pentafluoroethyl) trifluorophosphate anion.

Further, the method described in detail in the first embodiment can be applied to the method for producing the solid-state image sensor filter 10F.

PREPARATION EXAMPLES OF ACRYLIC POLYMER

Preparation Example 6

60 parts by weight of propylene glycol monomethyl ether acetate (PGMAc) was prepared as a polymerization solvent, 40 parts by weight of dicyclopentanyl methacrylate ($C_{14}H_{20}O_2$) was prepared as an acrylic monomer, and 0.44 parts by weight of benzoyl peroxide (BPO) was prepared as a radical polymerization initiator. These were placed in a reaction vessel having a stirring device and a reflux tube, and then stirred and refluxed for 8 hours while being heated to 80° C. with nitrogen gas being introduced into the reaction vessel. Thus, a homopolymer solution of dicyclopentanyl methacrylate was obtained. An extrapolated glass transition onset temperature of the polymer thus formed was measured by a method according to JIS K 7121. The extrapolated glass transition onset temperature was found to be 175° C.

Preparation Example 7

80 parts by weight of PGMAc was prepared as a polymerization solvent, 20 parts by weight of methyl methacrylate ($C_5H_8O_2$) was prepared as an acrylic monomer, and 0.48 parts by weight of BPO was prepared as a radical polymerization initiator. A homopolymer solution of methyl methacrylate was obtained in the same manner as in Preparation Example 6. An extrapolated glass transition onset temperature of the polymer thus formed was measured by a method according to JIS K 7121. The extrapolated glass transition onset temperature was found to be 105° C.

Preparation Example 8

The acrylic monomer, the polymerization solvent, and the radical polymerization initiator in Preparation Example 6 were changed as shown in Table 7 to obtain acrylic polymers of Preparation Example 8-1 to Preparation Example 8-9. Further, an extrapolated glass transition onset temperature of the acrylic polymer was measured.

TABLE 7

| Preparation example | Acrylic monomer 1 | Acrylic monomer 2 | Acrylic monomer 1 | 2 | BPO | PGMAc | Tg (° C.) |
|---|---|---|---|---|---|---|---|
| 8-1 | Dicyclopentanyl methacrylate | — | 40 | — | 0.44 | 60 | 175 |
| 8-2 | Isobornyl methacrylate | Methyl methacrylate | 10 | 10 | 0.35 | 80 | 139 |
| 8-3 | Dicyclopentanyl methacrylate | Methyl methacrylate | 10 | 10 | 0.35 | 80 | 137 |
| 8-4 | Dicyclopentanyl acrylate | Methyl methacrylate | 10 | 10 | 0.36 | 80 | 112 |
| 8-5 | Isobornyl acrylate | Methyl methacrylate | 10 | 10 | 0.36 | 80 | 99 |
| 8-6 | Cyclohexyl methacrylate | Methyl methacrylate | 10 | 10 | 0.39 | 80 | 94 |
| 8-7 | Dicyclopentanyl methacrylate | Methyl acrylate | 10 | 10 | 0.39 | 80 | 74 |
| 8-8 | Dicyclopentanyl acrylate | Methyl acrylate | 10 | 10 | 0.40 | 80 | 56 |
| 8-9 | Cyclohexyl methacrylate | Methyl acrylate | 10 | 10 | 0.43 | 80 | 35 |

Preparation Example 8-1

A homopolymer solution of dicyclopentanyl methacrylate was obtained in the same manner as in Preparation Example 6.

Preparation Example 8-2

80 parts by weight of PGMAc was prepared as a polymerization solvent, 10 parts by weight of isobornyl methacrylate ($C_{14}H_{22}O_2$) and 10 parts by weight of methyl methacrylate were prepared as acrylic monomers, and 0.35 parts by weight of BPO was prepared as a radical polymerization initiator. A polymer solution containing a copolymer of isobornyl methacrylate and methyl methacrylate was obtained in the same manner as in Preparation Example 6. An extrapolated glass transition onset temperature of the copolymer thus formed was calculated by a method according to JIS K 7121. The extrapolated glass transition onset temperature was found to be 139° C.

Preparation Example 8-3

80 parts by weight of PGMAc was prepared as a polymerization solvent, 10 parts by weight of dicyclopentanyl methacrylate and 10 parts by weight of methyl methacrylate were prepared as acrylic monomers, and 0.35 parts by weight of BPO was prepared as a radical polymerization initiator. A polymer solution containing a copolymer of dicyclopentanyl methacrylate and methyl methacrylate was obtained in the same manner as in Preparation Example 6. An extrapolated glass transition onset temperature of the copolymer thus formed was calculated by a method according to JIS K 7121. The extrapolated glass transition onset temperature was found to be 137° C.

Preparation Example 8-4

80 parts by weight of PGMAc was prepared as a polymerization solvent, 10 parts by weight of dicyclopentanyl acrylate ($C_{13}H_{18}O_2$) and 10 parts by weight of methyl methacrylate were prepared as acrylic monomers, and 0.36 parts by weight of BPO was prepared as a radical polymerization initiator. A polymer solution containing a copolymer of dicyclopentanyl acrylate and methyl methacrylate was obtained in the same manner as in Preparation Example 6. An extrapolated glass transition onset temperature of the copolymer thus formed was calculated by a method according to JIS K 7121. The extrapolated glass transition onset temperature was found to be 112° C.

Preparation Example 8-5

80 parts by weight of PGMAc was prepared as a polymerization solvent, 10 parts by weight of isobornyl acrylate ($C_{13}H_{20}O_2$) and 10 parts by weight of methyl methacrylate were prepared as acrylic monomers, and 0.36 parts by weight of BPO was prepared as a radical polymerization initiator. A polymer solution containing a copolymer of isobornyl acrylate and methyl methacrylate was obtained in the same manner as in Preparation Example 6. An extrapolated glass transition onset temperature of the copolymer thus formed was calculated by a method according to JIS K 7121. The extrapolated glass transition onset temperature was found to be 99° C.

Preparation Example 8-6

80 parts by weight of PGMAc was prepared as a polymerization solvent, 10 parts by weight of cyclohexyl methacrylate ($C_{10}H_{16}O_2$) and 10 parts by weight of methyl methacrylate were prepared as acrylic monomers, and 0.39 parts by weight of BPO was prepared as a radical polymerization initiator. A polymer solution containing a copolymer of cyclohexyl methacrylate and methyl methacrylate was obtained in the same manner as in Preparation Example 6. An extrapolated glass transition onset temperature of the copolymer thus formed was calculated by a method according to JIS K 7121. The extrapolated glass transition onset temperature was found to be 94° C.

Preparation Example 8-7

80 parts by weight of PGMAc was prepared as a polymerization solvent, 10 parts by weight of dicyclopentanyl methacrylate and 10 parts by weight of methyl acrylate ($C_4H_6O_2$) were prepared as acrylic monomers, and 0.39 parts by weight of BPO was prepared as a radical polymerization initiator. A polymer solution containing a copolymer of dicyclopentanyl methacrylate and methyl acrylate was obtained in the same manner as in Preparation Example 6. An extrapolated glass transition onset temperature of the copolymer thus formed was calculated by a method according to JIS K 7121. The extrapolated glass transition onset temperature was found to be 74° C.

Preparation Example 8-8

80 parts by weight of PGMAc was prepared as a polymerization solvent, 10 parts by weight of dicyclopentanyl acrylate and 10 parts by weight of methyl acrylate were prepared as acrylic monomers, and 0.40 parts by weight of BPO was prepared as a radical polymerization initiator. A polymer solution containing a copolymer of dicyclopentanyl acrylate and methyl acrylate was obtained in the same manner as in Preparation Example 6. An extrapolated glass transition onset temperature of the copolymer thus formed was calculated according to JIS K 7121. The extrapolated glass transition onset temperature was found to be 56° C.

Preparation Example 8-9

80 parts by weight of PGMAc was prepared as a polymerization solvent, 10 parts by weight of cyclohexyl methacrylate and 10 parts by weight of methyl acrylate were prepared as acrylic monomers, and 0.43 parts by weight of BPO was prepared as a radical polymerization initiator. A polymer solution containing a copolymer of cyclohexyl methacrylate and methyl acrylate was obtained in the same manner as in Preparation Example 6. An extrapolated glass transition onset temperature of the copolymer thus formed was calculated by a method according to JIS K 7121. The extrapolated glass transition onset temperature was found to be 35° C.

Preparation Example 9

The amount of acrylic monomer, radical polymerization initiator and polymerization solvent used, and the polymerization time in Preparation Example 6 were changed as shown in Table 8 to obtain acrylic polymers of Preparation Example 9-1 to Preparation Example 9-6. Further, the acrylic polymer was analyzed using 1H-NMR (400 MHz) to calculate a residual amount of acrylic monomer (RM) represented by the following formula.

$$RM=MM/MS\times100$$

where MM is the area ratio of the peak of the acrylic monomer in the NMR spectrum of the acrylic polymer, and MS is the sum of the area ratio of the peak of the acrylic polymer and the peak of the acrylic monomer in the NMR spectrum of the acrylic polymer.

TABLE 8

| Preparation example | Amount used (parts by weight) | | | Polymerization time (hours) | Residual amount of monomer (%) |
|---|---|---|---|---|---|
| | Dicyclopentanyl methacrylate | BPO | PGMAc | | |
| 9-1 | 40 | 0.44 | 60 | 8 | 3 |
| 9-2 | 40 | 0.44 | 60 | 6 | 10 |
| 9-3 | 40 | 0.44 | 60 | 5 | 20 |
| 9-4 | 20 | 0.22 | 80 | 8 | 25 |
| 9-5 | 20 | 0.22 | 80 | 6 | 30 |
| 9-6 | 20 | 0.22 | 80 | 4 | 45 |

Preparation Example 9-1

A homopolymer solution of dicyclopentanyl methacrylate was obtained in the same manner as in Preparation Example 6. A residual amount of monomer in the homopolymer solution was calculated by analysis using 1H-NMR (400 MHz). The residual amount of monomer (RM) was found to be 3%.

Preparation Example 9-2

A homopolymer solution of dicyclopentanyl methacrylate was obtained in the same manner as in Preparation Example 9-1 except that the polymerization time was changed to 6 hours. A residual amount of monomer in the homopolymer solution was calculated by analysis using 1H-NMR (400 MHz). The residual amount of monomer (RM) was found to be 10%.

Preparation Example 9-3

A homopolymer solution of dicyclopentanyl methacrylate was obtained in the same manner as in Preparation Example 9-1 except that the polymerization time was changed to 5 hours. A residual amount of monomer in the homopolymer solution was calculated by analysis using 1H-NMR (400 MHz). The residual amount of monomer (RM) was found to be 20%.

Preparation Example 9-4

80 parts by weight of PGMAc was prepared as a polymerization solvent, 20 parts by weight of dicyclopentanyl methacrylate was prepared as an acrylic monomer, and 0.22 parts by weight of BPO was prepared as a radical polymerization initiator. A homopolymer solution of dicyclopentanyl methacrylate was obtained in the same manner as in Preparation Example 6. A residual amount of monomer in the homopolymer solution was calculated by analysis using 1H-NMR (400 MHz). The residual amount of monomer (RM) was found to be 25%.

Preparation Example 9-5

A homopolymer solution of dicyclopentanyl methacrylate was obtained in the same manner as in Preparation Example 9-4 except that the polymerization time was changed to 6 hours. A residual amount of monomer in the homopolymer solution was calculated by analysis using 1H-NMR (400 MHz). The residual amount of monomer (RM) was found to be 30%.

Preparation Example 9-6

A homopolymer solution of dicyclopentanyl methacrylate was obtained in the same manner as in Preparation Example 9-4 except that the polymerization time was changed to 4 hours. A residual amount of monomer in the homopolymer solution was calculated by analysis using 1H-NMR (400 MHz). The residual amount of monomer (RM) was found to be 45%.

Preparation Example 10

The amount of acrylic monomer, polymerization solvent and radical polymerization initiator used in Preparation Example 6 were changed as shown in Table 9 to obtain acrylic polymers of Preparation Example 10-1 to Preparation Example 10-5. Further, a weight average molecular weight of the acrylic polymer was calculated by analysis using gel permeation chromatography.

TABLE 9

| Preparation example | Amount used (parts by weight) | | | Weight average molecular weight (k) |
| --- | --- | --- | --- | --- |
| | Dicyclopentanyl methacrylate | BPO | PGMAc | |
| 10-1 | 10 | 0.11 | 90 | 5 |
| 10-2 | 20 | 0.11 | 80 | 10 |
| 10-3 | 40 | 1.76 | 60 | 30 |
| 10-4 | 40 | 0.88 | 60 | 50 |
| 10-5 | 40 | 0.44 | 60 | 100 |

Preparation Example 10-1

90 parts by weight of PGMAc was prepared as a polymerization solvent, 10 parts by weight of dicyclopentanyl methacrylate was prepared as an acrylic monomer, and 0.11 parts by weight of BPO was prepared as a radical polymerization initiator. A homopolymer solution of dicyclopentanyl methacrylate was obtained in the same manner as in Preparation Example 1. A weight average molecular weight of the acrylic polymer was calculated by analysis using gel permeation chromatography. The weight average molecular weight of the acrylic polymer was found to be 5,000.

Preparation Example 10-2

A homopolymer solution of dicyclopentanyl methacrylate was obtained in the same manner as in Preparation Example 10-1 except that 20 parts by weight of dicyclopentanyl methacrylate was prepared as an acrylic monomer, and 80 parts by weight of PGMAc was prepared as a polymerization solvent. A weight average molecular weight of the acrylic polymer was calculated by analysis using gel permeation chromatography. The weight average molecular weight of the acrylic polymer was found to be 10,000.

Preparation Example 10-3

40 parts by weight of dicyclopentanyl methacrylate was prepared as an acrylic monomer, 60 parts by weight of PGMAc was prepared as a polymerization solvent, and 1.76 parts by weight of BPO was prepared as a radical polymerization initiator. A homopolymer solution of dicyclopentanyl methacrylate was obtained in the same manner as in Preparation Example 10-1. A weight average molecular weight of the acrylic polymer was calculated by analysis using gel permeation chromatography. The weight average molecular weight of the acrylic polymer was found to be 30,000.

Preparation Example 10-4

A homopolymer solution of dicyclopentanyl methacrylate was obtained in the same manner as in Preparation Example 10-3 except that 0.88 parts by weight of BPO was prepared as a radical polymerization initiator. A weight average molecular weight of the acrylic polymer was calculated by analysis using gel permeation chromatography. The weight average molecular weight of the acrylic polymer was found to be 50,000.

Preparation Example 10-5

A homopolymer solution of dicyclopentanyl methacrylate was obtained in the same manner as in Preparation Example 10-3 except that 0.44 parts by weight of BPO was prepared as a radical polymerization initiator. A weight average molecular weight of the acrylic polymer was calculated by analysis using gel permeation chromatography. The weight average molecular weight of the acrylic polymer was found to be 100,000.

TEST EXAMPLES

Side Chain of Acrylic Polymer

Test Example 6

A coating liquid containing 0.3 g of cyanine dye, 12.0 g of a 25% homopolymer solution of dicyclopentanyl methacrylate, and 10 g of propylene glycol monomethyl ether acetate was prepared. The cyanine dye used was the dye represented by the above formula (6), and the homopolymer solution used was the homopolymer solution described in the above Preparation Example 6. The coating liquid was applied to the transparent substrate, and the coating film was dried. The coating film was then thermally cured by post baking at 230° C. to obtain an infrared cut-off filter of Test Example 1 having 1 μm thickness.

Test Example 7

An infrared cut-off filter of Test Example 7 was obtained in the same manner as in Test Example 6 except that a homopolymer solution of methyl methacrylate described in Preparation Example 7 was used instead of the homopolymer solution of dicyclopentanyl methacrylate in Test Example 6.

Evaluation Method

A transmittance of the infrared cut-off filter for light with a wavelength of 350 nm to 1150 nm was measured using a spectrophotometer (U-4100, manufactured by Hitachi High-Technologies Corporation). From the measurement result of the transmittance, an absorbance was calculated. Thus, an absorbance spectrum of each infrared cut-off filter was obtained. The absorbance spectrum of the cyanine dye represented by the above formula (6) has a peak at 950 nm. Therefore, it was determined whether the absorbance at 950 nm of each infrared cut-off filter was 0.8 or more. An infrared cut-off filter having the absorbance at 950 nm of 0.8 or more has an infrared light absorption ability suitable for use in a solid-state image sensor.

Evaluation Results

The absorbance at 950 nm of the infrared cut-off filter of Test Example 6 was found to be 0.9, which is larger than 0.8. On the other hand, the absorbance of the infrared cut-off filter of Test Example 7 was found to be 0.5, which is less than 0.8. Accordingly, the comparison between the infrared cut-off filter of Test Example 6 and the infrared cut-off filter of Test Example 7 found that a decrease in absorbance of the infrared cut-off filter was suppressed due to the acrylic monomer constituting the infrared cut-off filter having an alicyclic structure. The reason for this seems to be that an alicyclic structure located in the side chain of the acrylic polymer in the infrared cut-off filter of Test Example 6 is located between a cyanine dye and another cyanine dye, whereby a distance sufficient to prevent occurrence of aggregation between cyanine dyes is formed between the cyanine dyes.

Glass Transition Temperature of Acrylic Polymer

Test Example 8

Acrylic polymers of Preparation Example 8-1 to Preparation Example 8-9, each having an alicyclic structure and a different glass transition temperature of the polymer, were prepared. Then, a coating liquid containing 0.3 g of cyanine dye, 12 g of a 25% polymer solution, and 10 g of propylene glycol monomethyl ether acetate was prepared. The cyanine dye used was the cyanine dye represented by the above formula (6). Infrared cut-off filters of Test Example 8-1 to Test Example 8-9 were obtained by forming an infrared cut-off filter in the same manner as in Test Example 6. The infrared cut-off filter of each test example thus obtained had a 1 μm thickness.

Evaluation Method

The infrared absorbance of the infrared cut-off filters of Test Example 8-1 to Test Example 8-9 was evaluated by the same evaluation method as that performed for the infrared cut-off filter of Test Example 6 and the infrared cut-off filter of Test Example 7.

Evaluation Results

Table 10 below shows the absorbance at 950 nm of the infrared cut-off filters of Test Example 8-1 to Test Example 8-9.

TABLE 10

| Test example | Absorbance |
|---|---|
| 8-1 | 0.90 |
| 8-2 | 0.89 |
| 8-3 | 0.92 |
| 8-4 | 0.85 |
| 8-5 | 0.84 |
| 8-6 | 0.83 |
| 8-7 | 0.79 |
| 8-8 | 0.49 |
| 8-9 | 0.45 |

As seen from Table 10, the absorbance of Test Example 8-1 was 0.90, the absorbance of Test Example 8-2 was 0.89, and the absorbance of Test Example 8-3 was 0.92. Further, the absorbance of Test Example 8-4 was 0.85, the absorbance of Test Example 8-5 was 0.84, and the absorbance of Test Example 8-6 was 0.83. Further, the absorbance of Test Example 8-7 was 0.79, the absorbance of Test Example 8-8 was 0.49, and the absorbance of Test Example 8-9 was 0.45. Thus, the absorbance at 950 nm in each infrared cut-off filter was calculated. In the infrared cut-off filters of Test Example 8-1 to Test Example 8-6, the absorbance was found to be 0.8 or more. On the other hand, in the infrared cut-off filters of Test Example 8-7 to Test Example 8-9, the absorbance was found to be less than 0.8. From the above results, the glass transition temperature of the acrylic polymer in the infrared cut-off filter is found to be preferably 75° C. or higher.

Residual Amount of Acrylic Monomer

Test Example 9

Acrylic polymers of Preparation Example 9-1 to Preparation Example 9-6, each having an alicyclic structure and a different residual monomer amount in the polymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). The coating liquid was applied to the transparent substrate, and the coating film was dried. The coating film was then thermally cured by post baking at 230° C. to obtain infrared cut-off filters of Test Example 4-1 to Test Example 4-6. The infrared cut-off filter of each test example thus obtained had a 1 μm thickness.

Evaluation Method

The infrared absorbance of the infrared cut-off filters of Test Example 9-1 to Test Example 9-6 was evaluated by the same evaluation method as that performed for the infrared cut-off filter of Test Example 6 and the infrared cut-off filter of Test Example 7.

Evaluation Results

Table 11 below shows the absorbance at 950 nm of the infrared cut-off filters of Test Example 9-1 to Test Example 9-6.

TABLE 11

| Test example | Absorbance |
|---|---|
| 9-1 | 0.90 |
| 9-2 | 0.89 |
| 9-3 | 0.88 |
| 9-4 | 0.78 |
| 9-5 | 0.75 |
| 9-6 | 0.73 |

As seen from Table 11, the absorbance of Test Example 9-1 was 0.90, the absorbance of Test Example 9-2 was 0.89, and the absorbance of Test Example 9-3 was 0.88. Further, the absorbance of Test Example 9-4 was 0.78, the absorbance of Test Example 9-5 was 0.75, and the absorbance of Test Example 9-6 was 0.73.

As described above, in the infrared cut-off filters of Test Example 9-1 to Test Example 9-3, the absorbance at 950 nm was found to be 0.8 or more. On the other hand, in the infrared cut-off filters of Test Example 9-4 to Test Example 9-6, the absorbance at 950 nm was found to be less than 0.8. From the above results, the residual amount of monomer in the infrared cut-off filter is found to be preferably 20% or less.

Average Molecular Weight of Acrylic Monomer

Test Example 10

Acrylic polymers of Preparation Example 10-1 to Preparation Example 10-5, each having an alicyclic structure and a different weight average molecular weight of the polymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). The coating liquid was applied to the transparent substrate, and the coating film was dried. The coating film was then thermally cured by post baking at 230° C. to obtain infrared cut-off filters of Test Example 10-1 to Test Example 10-5. The infrared cut-off filter of each test example thus obtained had a 1 μm thickness.

Evaluation Method

The infrared absorbance of the infrared cut-off filters of Test Example 10-1 to Test Example 10-5 was evaluated by the same evaluation method as that performed for the infrared cut-off filter of Test Example 6 and the infrared cut-off filter of Test Example 7.

Evaluation Results

Table 12 below shows the absorbance at 950 nm of the infrared cut-off filters of Test Example 10-1 to Test Example 10-5.

TABLE 12

| Test example | Absorbance |
| --- | --- |
| 10-1 | 0.78 |
| 10-2 | 0.79 |
| 10-3 | 0.89 |
| 10-4 | 0.90 |
| 10-5 | 0.90 |

As seen from Table 12, the absorbance of Test Example 10-1 was 0.78, the absorbance of Test Example 10-2 was 0.79, and the absorbance of Test Example 10-3 was 0.89. Further, the absorbance of Test Example 10-4 was 0.90, and the absorbance of Test Example 10-5 was 0.90.

As described above, in the infrared cut-off filters of Test Example 10-1 and Test Example 10-2, the absorbance at 950 nm was found to be less than 0.8. On the other hand, in the infrared cut-off filters of Test Example 10-3 to Test Example 10-5, the absorbance at 950 nm was found to be 0.8 or more. From the above results, the average molecular weight of acrylic polymer in the infrared cut-off filter is found to be preferably 30,000 or more.

As described above, according to an embodiment of the infrared cut-off filter, the solid-state image sensor filter, the solid-state image sensor, and the method for producing a solid-state image sensor filter, the following advantageous effects can be obtained in addition to the advantageous effects of the above (1-2) to (1-5).

(2-1) Since the alicyclic structure of the acrylic polymer is located between cyanine dyes adjacent to each other, a distance sufficient to prevent occurrence of aggregation between cyanine dyes can be formed between the cyanine dyes. This prevents a decrease in absorbance at the expected absorption wavelength of the cyanine dye. Accordingly, a decrease in infrared absorbance of the infrared cut-off filter 13 can be suppressed.

Third Embodiment

A third embodiment of an infrared cut-off filter, a solid-state image sensor filter, a solid-state image sensor, and a method for producing a solid-state image sensor filter will be described. In the infrared cut-off filter of the third embodiment, a unit structure necessary for the acrylic polymer in the infrared cut-off filter is different from that of the acrylic polymer in the infrared cut-off filter of the first embodiment and the acrylic polymer in the infrared cut-off filter of the second embodiment. Therefore, the following description will be given of the details of the acrylic polymer which is different between the embodiments.

Infrared Cut-Off Filter

The infrared cut-off filter 13 will be described in more detail below.

The infrared cut-off filter 13 includes: a cyanine dye containing a cation having a polymethine and a nitrogen-containing heterocycle located at each end of the polymethine, and a tris(pentafluoroethyl) trifluorophosphate (FAP) anion; and an acrylic polymer having a unit structure represented by the following formula (3).

The cyanine dye contains a cation and an anion. In the present embodiment, the cyanine dye contains a cation as a compound containing a nitrogen atom, and an FAP anion.

<Chem. 55>

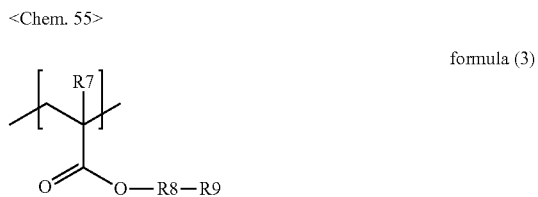

formula (3)

In the above formula (3), R7 is a hydrogen atom or a methyl group. R8 is a single bond, a linear alkylene group having 1 or more carbon atoms, a branched alkylene group having 3 or more carbon atoms, or an oxyalkylene group having 1 or more carbon atoms. R9 is a cyclic ether group containing an oxygen atom and 2 or more carbon atoms.

The cyanine dye contained in the infrared cut-off filter 13 may be the cyanine dye described in the first embodiment.

As described above, the acrylic polymer contains a cyclic ether group in the side chain. In the acrylic polymer, R7 is a hydrogen atom or a methyl group, R8 is a single bond, a linear alkylene group having 1 or more carbon atoms, a branched alkylene group having 3 or more carbon atoms, or an oxyalkylene group having 1 or more carbon atoms. R8 may be, for example, a methylene group, an ethylene group, a trimethylene group, a propylene group, a butylene group, or the like. In the acrylic polymer, R9 is a cyclic ether group containing an oxygen atom and 2 or more carbon atoms. The cyclic ether group has an ether bond in a cyclic ring formed containing a plurality of carbon atoms. Examples of the cyclic ether group include an epoxy group, an oxetanyl group, a tetrahydrofuranyl group, and a tetrahydropyranyl group.

The acrylic polymer is a polymer compound obtained by polymerizing monomers containing acrylic acid or methacrylic acid. The monomer containing acrylic acid is an acrylate, and the monomer containing methacrylic acid is a methacrylate.

Examples of the monomer containing a cyclic ether group in the acrylic polymer include glycidyl methacrylate represented by the following formula (53).

<Chem. 56>

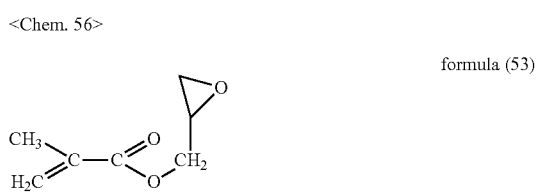

formula (53)

Examples of the monomer containing a cyclic ether group in the acrylic polymer further include glycidyl acrylate, 2-methylglycidyl (meth)acrylate, 2-ethylglycidyl (meth)acrylate, 2-oxiranyl ethyl (meth)acrylate, 2-glycidyloxyethyl (meth)acrylate, 3-glycidyl oxypropyl (meth)acrylate, glycidyloxyphenyl (meth)acrylate, oxetanyl (meth)acrylate, 3-methyl-3-oxetanyl (meth)acrylate, 3-ethyl-3-oxetanyl (meth)acrylate, (3-methyl-3-oxetanyl) methyl (meth)acrylate, (3-ethyl-3-oxetanyl) methyl (meth)acrylate, 2-(3-methyl-3-oxetanyl) ethyl (meth)acrylate, 2-(3-ethyl-3-oxetanyl) ethyl (meth)acrylate, 2-[(3-methyl-3-oxetanyl) methyloxy] ethyl (meth)acrylate, 2-[(3-ethyl-3-oxetanyl) methyloxy] ethyl (meth)acrylate, 3-[(3-methyl-3-oxetanyl) methyloxy] propyl (meth)acrylate, 3-[(3-ethyl-3-oxetanyl) methyloxy] propyl (meth)acrylate, and tetrahydrofurfuryl (meth)acrylate.

In the present embodiment, the acrylic polymer constituting the infrared cut-off filter 13 together with cyanine dye contains a cyclic ether group in the side chain. Therefore, the infrared absorbance of the infrared cut-off filter 13 after heating is prevented from becoming lower than the infrared absorbance of the infrared cut-off filter 13 before heating.

The acrylic polymer may be a polymer obtained by polymerizing only one of the above acrylic monomers, or may be a copolymer obtained by polymerizing two or more of the above acrylic monomers. The acrylic polymer may also contain an acrylic monomer other than the above acrylic monomers.

The acrylic monomer other than the above acrylic monomers may be, for example, an acrylic monomer containing an aromatic ring. Examples of the acrylic monomer containing an aromatic ring include acrylic monomers listed in the first embodiment.

Further, the acrylic monomer other than the above acrylic monomers may be, for example, an acrylic monomer containing an alicyclic structure. Examples of the acrylic monomer containing an alicyclic structure include acrylic monomers listed in the second embodiment.

Further, the acrylic polymer may also contain an acrylic monomer having a functional group which reacts with a cyclic ether group of the acrylic polymer. When the functional group of the acrylic monomer which reacts with a cyclic ether group is reacted with the cyclic ether group of the acrylic polymer, a crosslinked structure is formed. This improves thermal stability of the infrared cut-off filter containing a cyanine dye. Examples of the acrylic monomer having a functional group which reacts with a cyclic ether group include an acrylic monomer containing a carboxyl group such as acrylic acid or methacrylic acid, an acrylic monomer containing a phenolic functional group such as 4-hydroxyphenyl (meth)acrylate, and an acrylic monomer containing an amine group.

The acrylic polymer may also contain a monomer other than the above acrylic monomers.

Examples of the monomer other than the above acrylic monomers include monomers listed in the first embodiment. Further, as with the acrylic polymer in the first embodiment, the acrylic polymer may also contain a monomer for adjusting the polarity of the acrylic polymer. When the acrylic polymer is a copolymer obtained by polymerizing two or more acrylic monomers, the acrylic copolymer may have any of the structures listed in the first embodiment. A polymerization method for obtaining an acrylic polymer may be any of the polymerization methods described in the first embodiment.

The glass transition temperature of the acrylic polymer is preferably 75° C. or higher, and more preferably 100° C. or higher as with the acrylic polymer in the first embodiment. When the glass transition temperature is 75° C. or higher, it is possible to prevent a decrease in infrared absorbance of the infrared cut-off filter.

The molecular weight of the acrylic polymer is preferably 30,000 or more and 150,000 or less, and more preferably 50,000 or more and 150,000 or less as in the first embodiment. When the molecular weight of the acrylic polymer is within the above ranges, it is possible to prevent a decrease in infrared absorbance of the infrared cut-off filter. It is difficult to produce a coating liquid containing an acrylic polymer having a molecular weight of more than 150,000 together with the cyanine dye, since the viscosity increases during polymerization. Therefore, when the molecular weight of the acrylic polymer is more than 150,000, it is difficult to produce the infrared cut-off filter 13. On the other hand, when the molecular weight of the acrylic polymer is 150,000 or less, it is possible to prepare a coating liquid containing the acrylic polymer and the cyanine dye. Accordingly, the infrared cut-off filter 13 can be more easily produced.

The percentage (MM/MS×100) of the mass of the acrylic monomer (MM) to the sum of the mass of the acrylic polymer and the mass of the acrylic monomer constituting the acrylic polymer (MS) is preferably 20% or less as in the first embodiment. Compared with a case where the residual monomer is more than 20%, the infrared absorbance of the cyanine dye is less likely to decrease.

Further, the percentage (MM/MS×100) of the mass of the acrylic monomer (MM) to the sum of the mass of the acrylic polymer and the mass of the acrylic monomer constituting the acrylic polymer (MS) is more preferably 10% or less, and still more preferably 3% or less. The infrared cut-off filter 13 can have a thickness of, for example, 300 nm or more and 3 μm or less.

Method for Producing Solid-State Image Sensor Filter

A method for producing the solid-state image sensor filter 10F includes the steps of forming the infrared cut-off filter 13, and patterning the infrared cut-off filter 13 by dry etching. The step of forming the infrared cut-off filter 13 includes forming the infrared cut-off filter 13 containing a cyanine dye and an acrylic polymer having a unit structure represented by the above formula (3). The cyanine dye contains a cation having a polymethine and a nitrogen-containing heterocycle located at each end of the polymethine, and a tris(pentafluoroethyl) trifluorophosphate anion.

Further, the method described in detail in the first embodiment can be applied to the method for producing the solid-state image sensor filter 10F.

Preparation Examples of Acrylic Polymer

Preparation Example 11

60 parts by weight of propylene glycol monomethyl ether acetate (PGMAc) was prepared as a polymerization solvent, 28 parts by weight of phenyl methacrylate ($C_{10}H_{10}O_2$), 6 parts by weight of 4-hydroxyphenyl methacrylate ($C_{10}H_{10}O_3$), and 6 parts by weight of glycidyl methacrylate ($C_7H_{10}O_3$) were prepared as acrylic monomers. Further, 0.60 parts by weight of benzoyl peroxide (BPO) was prepared as a radical polymerization initiator. These were placed in a reaction vessel having a stirring device and a reflux tube, and then stirred and refluxed for 8 hours while being heated to 80° C. with nitrogen gas being introduced into the reaction vessel. Thus, a polymer solution containing a copolymer of phenyl methacrylate, 4-hydroxyphenyl methacrylate, and glycidyl methacrylate was obtained. An extrapolated glass transition onset temperature of the copolymer thus formed was measured by a method according to JIS K 7121. The extrapolated glass transition onset temperature was found to be 101° C.

Preparation Example 12

60 parts by weight of PGMAc was prepared as a polymerization solvent, 40 parts by weight of phenyl methacrylate was prepared as an acrylic monomer, and 0.60 parts by weight of BPO was prepared as a radical polymerization initiator. A homopolymer solution of phenyl methacrylate was obtained in the same manner as in Preparation Example 11. An extrapolated glass transition onset temperature of the polymer thus formed was measured by a method according to JIS K 7121. The extrapolated glass transition onset temperature was found to be 113° C.

Preparation Example 13

The acrylic monomer, the polymerization solvent, and the radical polymerization initiator in Preparation Example 1 were changed as shown in Table 13 and Table 14 to obtain acrylic polymers of Preparation Example 13-1 to Preparation Example 13-10. Further, an extrapolated glass transition onset temperature of the acrylic polymer was measured.

TABLE 13

| Preparation example | Acrylic monomer 1 | Acrylic monomer 2 | Acrylic monomer 3 | Tg (° C.) |
|---|---|---|---|---|
| 13-1 | Phenyl methacrylate | 4-hydroxyphenyl methacrylate | Glycidyl methacrylate | 101 |
| 13-2 | Phenyl methacrylate | 4-hydroxyphenyl methacrylate | Glycidyl methacrylate | 104 |
| 13-3 | Phenyl methacrylate | Methacrylic acid | Glycidyl methacrylate | 106 |
| 13-4 | Phenyl methacrylate | — | — | 113 |
| 13-5 | Phenyl methacrylate | Methyl methacrylate | — | 109 |
| 13-6 | 2-[3-(2H-benzotriazole-2-yl)-4-hydroxyphenyl] ethyl methacrylate | Methyl methacrylate | — | 85 |
| 13-7 | Dicyclopentanyl methacrylate | — | — | 175 |
| 13-8 | Benzyl methacrylate | Methacrylic acid | Glycidyl methacrylate | 64 |
| 13-9 | Cyclohexyl methacrylate | Methacrylic acid | Glycidyl methacrylate | 73 |
| 13-10 | 2-phenoxyethyl acrylate | Methacrylic acid | Glycidyl methacrylate | 4 |

TABLE 14

| Preparation example | Acrylic monomer 1 | Acrylic monomer 2 | Acrylic monomer 3 | BPO | PGMAc |
|---|---|---|---|---|---|
| 13-1 | 28 | 6 | 6 | 0.60 | 60 |
| 13-2 | 28 | 8 | 4 | 0.60 | 60 |
| 13-3 | 28 | 6 | 6 | 0.69 | 60 |
| 13-4 | 40 | — | — | 0.60 | 60 |
| 13-5 | 10 | 10 | — | 0.39 | 80 |
| 13-6 | 10 | 10 | — | 0.32 | 80 |
| 13-7 | 40 | — | — | 0.44 | 60 |
| 13-8 | 14 | 2.4 | 3.6 | 0.32 | 80 |
| 13-9 | 14 | 2.4 | 3.6 | 0.33 | 80 |
| 13-10 | 14 | 2.4 | 3.6 | 0.31 | 80 |

Preparation Example 13-1

A polymer solution containing a copolymer of phenyl methacrylate, 4-hydroxyphenyl methacrylate, and glycidyl methacrylate was obtained in the same manner as in Preparation Example 11.

Preparation Example 13-2

28 parts by weight of phenyl methacrylate, 8 parts by weight of 4-hydroxyphenyl methacrylate, and 4 parts by weight of glycidyl methacrylate were prepared as acrylic monomers. A polymer solution containing a copolymer of phenyl methacrylate, 4-hydroxyphenyl methacrylate, and glycidyl methacrylate was obtained in the same manner as in Preparation Example 13-1. An extrapolated glass transition onset temperature of the copolymer thus formed was calculated by a method according to JIS K 7121. The extrapolated glass transition onset temperature was found to be 104° C.

Preparation Example 13-3

28 parts by weight of phenyl methacrylate, 6 parts by weight of methacrylic acid ($C_4H_6O_2$), and 6 parts by weight of glycidyl methacrylate were prepared as acrylic monomers, and 0.69 parts by weight of BPO was prepared as a radical polymerization initiator. A polymer solution containing a copolymer of phenyl methacrylate, methacrylic acid, and glycidyl methacrylate was obtained in the same manner as in Preparation Example 13-1. An extrapolated glass transition onset temperature of the copolymer thus formed was calculated by a method according to JIS K 7121. The extrapolated glass transition onset temperature was found to be 106° C.

Preparation Example 13-4

A homopolymer solution of phenyl methacrylate was obtained in the same manner as in Preparation Example 11 except that 40 parts by weight of phenyl methacrylate only was prepared as an acrylic monomer. An extrapolated glass transition onset temperature of the polymer thus formed was calculated by a method according to JIS K 7121. The extrapolated glass transition onset temperature was found to be 113° C.

Preparation Example 13-5

80 parts by weight of PGMAc was prepared as a polymerization solvent, 10 parts by weight of phenyl methacrylate and 10 parts by weight of methyl methacrylate ($C_5H_8O_2$) were prepared as acrylic monomers, and 0.39 parts by weight of BPO was prepared as a radical polymerization initiator. A polymer solution containing a copolymer of phenyl methacrylate and methyl methacrylate was obtained in the same manner as in Preparation Example 11. An extrapolated glass transition onset temperature of the copolymer thus formed was calculated by a method according to JIS K 7121. The extrapolated glass transition onset temperature was found to be 109° C.

Preparation Example 13-6

80 parts by weight of PGMAc was prepared as a polymerization solvent, 10 parts by weight of 2-[3-(2H-benzotriazole-2-yl)-4-hydroxyphenyl] ethyl methacrylate ($C_{18}H_{17}N_3O_3$) and 10 parts by weight of methyl methacrylate were prepared as acrylic monomers, and 0.32 parts by weight of BPO was prepared as a radical polymerization initiator. A polymer solution containing a copolymer of 2-[3-(2H-benzotriazole-2-yl)-4-hydroxyphenyl] ethyl methacrylate and methyl methacrylate was obtained in the same manner as in Preparation Example 11. An extrapolated glass transition onset temperature of the copolymer thus formed was calculated by a method according to JIS K 7121. The extrapolated glass transition onset temperature was found to be 85° C.

Preparation Example 13-7

A homopolymer solution of dicyclopentanyl methacrylate was obtained in the same manner as in Preparation Example 11 except that 40 parts by weight of dicyclopentanyl methacrylate ($C_{14}H_{20}O_2$) only was prepared as an acrylic monomer, and 0.44 parts by weight of BPO was prepared as a radical polymerization initiator. An extrapolated glass transition onset temperature of the polymer thus formed was calculated by a method according to JIS K 7121. The extrapolated glass transition onset temperature was found to be 175° C.

Preparation Example 13-8

80 parts by weight of PGMAc was prepared as a polymerization solvent, 14 parts by weight of benzyl methacrylate ($C_{11}H_{12}O_2$), 2.4 parts by weight of methacrylic acid, and 3.6 parts by weight of glycidyl methacrylate were prepared as acrylic monomers, and 0.32 parts by weight of BPO was prepared as a radical polymerization initiator. A polymer solution containing a copolymer of benzyl methacrylate, methacrylic acid, and glycidyl methacrylate was obtained in the same manner as in Preparation Example 11. An extrapolated glass transition onset temperature of the copolymer thus formed was calculated by a method according to JIS K 7121. The extrapolated glass transition onset temperature was found to be 64° C.

Preparation Example 13-9

80 parts by weight of PGMAc was prepared as a polymerization solvent, 14 parts by weight of cyclohexyl methacrylate ($C_{10}H_{16}O_2$), 2.4 parts by weight of methacrylic acid, and 3.6 parts by weight of glycidyl methacrylate were prepared as acrylic monomers, and 0.33 parts by weight of BPO was prepared as a radical polymerization initiator. A polymer solution containing a copolymer of cyclohexyl methacrylate, methacrylic acid, and glycidyl methacrylate was obtained in the same manner as in Preparation Example 11. An extrapolated glass transition onset temperature of the copolymer thus formed was calculated by a method according to JIS K 7121. The extrapolated glass transition onset temperature was found to be 73° C.

Preparation Example 13-10

80 parts by weight of PGMAc was prepared as a polymerization solvent, 14 parts by weight of 2-phenoxy ethyl acrylate ($C_{11}H_{12}O_3$), 2.4 parts by weight of methacrylic acid, and 3.6 parts by weight of glycidyl methacrylate were prepared as acrylic monomers, and 0.31 parts by weight of BPO was prepared as a radical polymerization initiator. A polymer solution containing a copolymer of 2-phenoxy ethyl acrylate, methacrylic acid, and glycidyl methacrylate was obtained in the same manner as in Preparation Example 11. An extrapolated glass transition onset temperature of the copolymer thus formed was calculated by a method according to JIS K 7121. The extrapolated glass transition onset temperature was found to be 4° C.

Preparation Example 14

The amount of acrylic monomer, radical polymerization initiator and polymerization solvent used, and the polymerization time in Preparation Example 11 were changed as shown in Table 15 to obtain acrylic polymers of Preparation Example 14-1 to Preparation Example 14-6. Further, the acrylic polymer was analyzed using 1H-NMR (400 MHz) to calculate a residual amount of acrylic monomer (RM) represented by the following formula.

$RM = MM/MS \times 100$ where MM is the area ratio of the peak of the acrylic monomer in the NMR spectrum of the acrylic polymer, and MS is the sum of the area ratio of the peak of the acrylic polymer and the peak of the acrylic monomer in the NMR spectrum of the acrylic polymer.

TABLE 15

| Preparation example | Amount used (parts by weight) | | | | | Polymerization time (hours) | Residual amount of monomer (%) |
|---|---|---|---|---|---|---|---|
| | Phenyl methacrylate | 4-hydroxyphenyl methacrylate | Glycidyl methacrylate | BPO | PGMAc | | |
| 14-1 | 28 | 6 | 6 | 0.60 | 60 | 8 | 3 |
| 14-2 | 28 | 6 | 6 | 0.60 | 60 | 6 | 10 |
| 14-3 | 28 | 6 | 6 | 0.60 | 60 | 4 | 20 |
| 14-4 | 14 | 3 | 3 | 0.30 | 80 | 8 | 25 |
| 14-5 | 14 | 3 | 3 | 0.30 | 80 | 6 | 30 |
| 14-6 | 14 | 3 | 3 | 0.30 | 80 | 4 | 45 |

Preparation Example 14-1

A polymer solution containing a copolymer of phenyl methacrylate, 4-hydroxyphenyl methacrylate, and glycidyl methacrylate was obtained in the same manner as in Preparation Example 11. A residual amount of monomer in the polymer solution was calculated by analysis using 1H-NMR (400 MHz). The residual amount of monomer (RM) was found to be 3%.

Preparation Example 14-2

A polymer solution containing a copolymer of phenyl methacrylate, 4-hydroxyphenyl methacrylate, and glycidyl methacrylate was obtained in the same manner as in Preparation Example 14-1 except that the polymerization time was changed to 6 hours. A residual amount of monomer in the polymer solution was calculated by analysis using 1H-NMR (400 MHz). The residual amount of monomer (RM) was found to be 10%.

Preparation Example 14-3

A polymer solution containing a copolymer of phenyl methacrylate, 4-hydroxyphenyl methacrylate, and glycidyl methacrylate was obtained in the same manner as in Preparation Example 14-1 except that the polymerization time was changed to 4 hours. A residual amount of monomer in the polymer solution was calculated by analysis using 1H-NMR (400 MHz). The residual amount of monomer (RM) was found to be 20%.

Preparation Example 14-4

80 parts by weight of PGMAc was prepared as a polymerization solvent, 14 parts by weight of phenyl methacrylate, 3 parts by weight of 4-hydroxyphenyl methacrylate, and 3 parts by weight of glycidyl methacrylate were prepared as acrylic monomers, and 0.30 parts by weight of BPO was prepared as a radical polymerization initiator. A polymer solution containing a copolymer of phenyl methacrylate, 4-hydroxyphenyl methacrylate, and glycidyl methacrylate was obtained in the same manner as in Preparation Example 14-1. A residual amount of monomer in the polymer solution was calculated by analysis using 1H-NMR (400 MHz). The residual amount of monomer (RM) was found to be 25%.

Preparation Example 14-5

A polymer solution containing a copolymer of phenyl methacrylate, 4-hydroxyphenyl methacrylate, and glycidyl methacrylate was obtained in the same manner as in Preparation Example 14-4 except that the polymerization time was changed to 6 hours. A residual amount of monomer in the polymer solution was calculated by analysis using 1H-NMR (400 MHz). The residual amount of monomer (RM) was found to be 30%.

Preparation Example 14-6

A polymer solution containing a copolymer of phenyl methacrylate, 4-hydroxyphenyl methacrylate, and glycidyl methacrylate was obtained in the same manner as in Preparation Example 14-4 except that the polymerization time was changed to 4 hours. A residual amount of monomer in the polymer solution was calculated by analysis using 1H-NMR (400 MHz). The residual amount of monomer (RM) was found to be 45%.

Preparation Example 15

The amount of acrylic monomer, polymerization solvent and radical polymerization initiator used in Preparation Example 11 were changed as shown in Table 16 to obtain acrylic copolymers of Preparation Example 15-1 to Preparation Example 15-5. Further, a weight average molecular weight of the acrylic copolymer was calculated by analysis using gel permeation chromatography.

TABLE 16

| Preparation example | Amount used (parts by weight) | | | | | Weight average molecular weight (k) |
| --- | --- | --- | --- | --- | --- | --- |
| | Phenyl methacrylate | 4-hydroxyphenyl methacrylate | Glycidyl methacrylate | BPO | PGMAc | |
| 15-1 | 14 | 3 | 3 | 1.50 | 80 | 5 |
| 15-2 | 14 | 3 | 3 | 1.00 | 80 | 10 |
| 15-3 | 28 | 6 | 6 | 1.00 | 60 | 30 |
| 15-4 | 28 | 6 | 6 | 0.60 | 60 | 50 |
| 15-5 | 28 | 6 | 6 | 0.20 | 60 | 100 |

Preparation Example 15-1

80 parts by weight of PGMAc was prepared as a polymerization solvent, 14 parts by weight of phenyl methacrylate, 3 parts by weight of 4-hydroxyphenyl methacrylate, and 3 parts by weight of glycidyl methacrylate were prepared as acrylic monomers, and 1.50 parts by weight of BPO was prepared as a radical polymerization initiator. A polymer solution containing a copolymer of phenyl methacrylate, 4-hydroxyphenyl methacrylate, and glycidyl methacrylate was obtained in the same manner as in Preparation Example 11. A weight average molecular weight of the acrylic copolymer was calculated by analysis using gel permeation chromatography. The weight average molecular weight of the acrylic copolymer was found to be 5,000.

Preparation Example 15-2

A polymer solution containing a copolymer of phenyl methacrylate, 4-hydroxyphenyl methacrylate, and glycidyl methacrylate was obtained in the same manner as in Preparation Example 15-1 except that that 1.00 parts by weight of BPO was prepared as a radical polymerization initiator. A weight average molecular weight of the acrylic copolymer was calculated by analysis using gel permeation chromatography. The weight average molecular weight of the acrylic copolymer was found to be 10,000.

Preparation Example 15-3

60 parts by weight of PGMAc was prepared as a polymerization solvent, 28 parts by weight of phenyl methacrylate, 6 parts by weight of 4-hydroxyphenyl methacrylate, and 6 parts by weight of glycidyl methacrylate were prepared as acrylic monomers, and 1.00 parts by weight of BPO was prepared as a radical polymerization initiator. A polymer solution containing a copolymer of phenyl methacrylate, 4-hydroxyphenyl methacrylate, and glycidyl methacrylate was obtained in the same manner as in Preparation Example 15-1. A weight average molecular weight of the acrylic copolymer was calculated by analysis using gel permeation chromatography. The weight average molecular weight of the acrylic copolymer was found to be 30,000.

Preparation Example 15-4

A polymer solution containing a copolymer of phenyl methacrylate, 4-hydroxyphenyl methacrylate, and glycidyl methacrylate was obtained in the same manner as in Preparation Example 15-3 except that that 0.60 parts by weight of BPO was prepared as a radical polymerization initiator. A weight average molecular weight of the acrylic copolymer was calculated by analysis using gel permeation chromatography. The weight average molecular weight of the acrylic copolymer was found to be 50,000.

Preparation Example 15-5

A polymer solution containing a copolymer of phenyl methacrylate, 4-hydroxyphenyl methacrylate, and glycidyl methacrylate was obtained in the same manner as in Preparation Example 15-3 except that that 0.20 parts by weight of BPO was prepared as a radical polymerization initiator. A weight average molecular weight of the acrylic copolymer was calculated by analysis using gel permeation chromatography. The weight average molecular weight of the acrylic copolymer was found to be 100,000.

TEST EXAMPLES

Side Chain of Acrylic Polymer

Test Example 11

A coating liquid containing 0.3 g of cyanine dye, 12.0 g of a 25% polymer solution, and 10 g of propylene glycol monomethyl ether acetate was prepared. The cyanine dye used was the dye represented by the above formula (6), and the polymer solution used was the one containing the copolymer described in the above Preparation Example 11. The coating liquid was applied to the transparent substrate, and the coating film was dried. The coating film was then thermally cured by post baking at 230° C. to obtain an infrared cut-off filter of Test Example 1 having 1 μm thickness.

Test Example 12

An infrared cut-off filter of Test Example 12 was obtained in the same manner as in Test Example 11 except that a homopolymer solution containing phenyl methacrylate described in Preparation Example 12 was used instead of the polymer solution containing a copolymer in Test Example 11.

Evaluation Method

A transmittance of the infrared cut-off filter of each test example for light with a wavelength of 350 nm to 1150 nm was measured using a spectrophotometer (U-4100, manufactured by Hitachi High-Technologies Corporation). From the measurement result of the transmittance, an absorbance was calculated. Thus, an absorbance spectrum of each infrared cut-off filter was obtained. The absorbance spectrum of the cyanine dye represented by the above formula (6) has a peak at 950 nm. Therefore, it was determined whether the absorbance at 950 nm of each infrared cut-off filter was 0.8 or more. An infrared cut-off filter having the absorbance at 950 nm of 0.8 or more has an infrared light absorption ability suitable for use in a solid-state image sensor.

After the transmittance of the infrared cut-off filter of each test example was measured, the infrared cut-off filter of each test example was heated to 250° C. The transmittance of the infrared cut-off filter of each test example after heating was measured in the same manner as that performed for the infrared cut-off filter of each test example before heating. From the measurement result of the transmittance, an absorbance was calculated. Thus, an absorbance spectrum of the infrared cut-off filter of each test example after heating was obtained. Then, it was determined whether the absorbance at 950 nm of the infrared cut-off filter of each test example after heating was 0.7 or more. As for the infrared cut-off filters heated to 250° C., the infrared cut-off filter having the absorbance at 950 nm of 0.7 or more has an infrared light absorption ability suitable for use in a solid-state image sensor.

Evaluation Results

The absorbance at 950 nm of the infrared cut-off filter of Test Example 11 before heating was found to be 0.96, and the absorbance at 950 nm of the infrared cut-off filter of Test Example 12 before heating was found to be 0.92. That is, in both test examples, the absorbance at 950 nm of the infrared cut-off filter before heating was found to be 0.8 or more.

On the other hand, the absorbance at 950 nm of the infrared cut-off filter of Test Example 11 after heating was found to be 0.8, which is larger than 0.7. Further, the absorbance at 950 nm of the infrared cut-off filter of Test Example 12 after heating was found to be 0.52, which is less than 0.7. Thus, it was found that a decrease in absorbance of the infrared cut-off filter after heating was suppressed due to the infrared cut-off filter containing an acrylic polymer having a cyclic ether group in the side chain.

Glass Transition Temperature of Acrylic Polymer

Test Example 13

Polymer solutions containing an acrylic copolymer of Preparation Example 13-1 to Preparation Example 13-10, each having a cyclic ether group and a different glass transition temperature of the polymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). Infrared cut-off filters of Test Example 13-1 to Test Example 13-10 were obtained by forming an infrared cut-off filter in the same manner as in Test Example 11. The infrared cut-off filter of each test example thus obtained had a 1 μm thickness.

Evaluation Method

The infrared absorbance of the infrared cut-off filters of Test Example 13-1 to Test Example 13-10 was evaluated by the same evaluation method as that performed for the infrared cut-off filter of Test Example 11 and the infrared cut-off filter of Test Example 12.

After the transmittance of the infrared cut-off filter was measured, the infrared cut-off filters of Test Example 13-1 to Test Example 13-7, having the absorbance before heating of 0.8 or more among the infrared cut-off filters of the above test examples, were heated to 250° C. The transmittance of the infrared cut-off filter of each test example after heating was measured in the same manner as that performed for the infrared cut-off filter of each test example before heating. From the measurement result of the transmittance, an absorbance was calculated. Thus, an absorbance spectrum of the infrared cut-off filter of each test example after heating was obtained. Then, it was determined whether the absorbance at 950 nm of the infrared cut-off filter of each test example after heating was 0.7 or more.

Evaluation Results

Table 17 below shows the absorbance at 950 nm of the infrared cut-off filters of Test Example 13-1 to Test Example 13-10.

TABLE 17

| Test example | Absorbance (before heating) | Absorbance (after heating) |
|---|---|---|
| 13-1 | 0.96 | 0.80 |
| 13-2 | 0.97 | 0.82 |
| 13-3 | 0.95 | 0.80 |
| 13-4 | 0.92 | 0.52 |
| 13-5 | 0.92 | 0.52 |
| 13-6 | 1.00 | 0.60 |
| 13-7 | 0.90 | 0.22 |
| 13-8 | 0.65 | — |
| 13-9 | 0.60 | — |
| 13-10 | 0.49 | — |

As seen from Table 17, the absorbance before heating of Test Example 13-1 was 0.96, the absorbance before heating of Test Example 13-2 was 0.97, and the absorbance before heating of Test Example 13-3 was 0.95. Further, the absorbance before heating of Test Example 13-4 was 0.92, the absorbance before heating of Test Example 13-5 was 0.92, and the absorbance before heating of Test Example 13-6 was 1.00. Further, the absorbance before heating of Test Example 13-7 was 0.90, the absorbance before heating of Test Example 13-8 was 0.65, and the absorbance before heating of Test Example 13-9 was 0.60. Further, the absorbance before heating of Test Example 13-10 was 0.49.

Thus, the absorbance at 950 nm in each infrared cut-off filter was calculated. In the infrared cut-off filters of Test Example 13-1 to Test Example 13-7, the absorbance was found to be 0.8 or more. On the other hand, in the infrared cut-off filters of Test Example 13-8 to Test Example 13-10, the absorbance was found to be less than 0.8. From the above results, as for the infrared cut-off filters before heating, the glass transition temperature of the acrylic polymer in the infrared cut-off filter is found to be preferably 75° C. or higher.

In addition, as seen from Table 17, the absorbance after heating of Test Example 13-1 was 0.80, the absorbance after heating of Test Example 13-2 was 0.82, and the absorbance after heating of Test Example 13-3 was 0.80. Further, the absorbance after heating of Test Example 13-4 was 0.52, the absorbance after heating of Test Example 13-5 was 0.52, and the absorbance after heating of Test Example 13-6 was 0.60. Further, the absorbance after heating of Test Example 13-7 was 0.22.

As described above, in the infrared cut-off filters of Test Example 13-1 to Test Example 13-3 after heating, the absorbance at 950 nm was found to be 0.7 or more. On the other hand, in the infrared cut-off filters of Test Example 13-4 to Test Example 13-7 after heating, the absorbance at 950 nm was found to be less than 0.7.

Residual Amount of Acrylic Monomer

Test Example 14

Polymer solutions containing an acrylic copolymer of Preparation Example 14-1 to Preparation Example 14-6, each having a cyclic ether group and a different residual monomer amount in the polymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). The coating liquid was applied to the transparent substrate, and the coating film was dried. The coating film was then thermally cured by post baking at 230° C. to obtain infrared cut-off filters of Test Example 14-1 to Test Example 14-6. The infrared cut-off filter of each test example thus obtained had a 1 μm thickness.

Evaluation Method

The infrared absorbance of the infrared cut-off filters of Test Example 14-1 to Test Example 14-6 was evaluated by the same evaluation method as that performed for the infrared cut-off filter of Test Example 11 and the infrared cut-off filter of Test Example 12.

After the transmittance of the infrared cut-off filter was measured, the infrared cut-off filters of Test Example 14-1 to Test Example 14-3, having the absorbance before heating of 0.8 or more among the infrared cut-off filters of the above test examples, were heated to 250° C. The transmittance of the infrared cut-off filter of each test example after heating was measured in the same manner as that performed for the infrared cut-off filter of each test example before heating. From the measurement result of the transmittance, an absorbance was calculated. Thus, an absorbance spectrum of the infrared cut-off filter of each test example after heating was obtained. Then, it was determined whether the absorbance at 950 nm of the infrared cut-off filter of each test example after heating was 0.7 or more.

Evaluation Results

Table 18 below shows the absorbance at 950 nm of the infrared cut-off filters of Test Example 14-1 to Test Example 14-6.

TABLE 18

| Test example | Absorbance (before heating) | Absorbance (after heating) |
|---|---|---|
| 14-1 | 0.96 | 0.80 |
| 14-2 | 0.96 | 0.80 |
| 14-3 | 0.95 | 0.79 |
| 14-4 | 0.79 | — |
| 14-5 | 0.78 | — |
| 14-6 | 0.78 | — |

As seen from Table 18, the absorbance before heating of Test Example 14-1 was 0.96, the absorbance before heating of Test Example 14-2 was 0.96, and the absorbance before heating of Test Example 14-3 was 0.95. Further, the absorbance before heating of Test Example 14-4 was 0.79, the absorbance before heating of Test Example 14-5 was 0.78, and the absorbance before heating of Test Example 14-6 was 0.78.

As described above, in the infrared cut-off filters of Test Example 14-1 to Test Example 14-3, the absorbance at 950 nm before heating was found to be 0.8 or more. On the other hand, in the infrared cut-off filters of Test Example 14-4 to Test Example 14-6, the absorbance at 950 nm before heating was found to be less than 0.8. From the above results, as for the infrared cut-off filters before heating, the residual amount of monomer in the infrared cut-off filter is found to be preferably 20% or less.

In addition, as seen from Table 18, the absorbance after heating of Test Example 14-1 was 0.80, the absorbance after heating of Test Example 14-2 was 0.80, and the absorbance after heating of Test Example 14-3 was 0.79. As described above, in the infrared cut-off filters of Test Example 14-1 to Test Example 14-3, the absorbance at 950 nm after heating was found to be 0.7 or more.

Average Molecular Weight of Acrylic Monomer

Test Example 15

Polymer solutions containing an acrylic copolymer of Preparation Example 15-1 to Preparation Example 15-5, each having a cyclic ether group and a different weight average molecular weight of the copolymer, were prepared. Then, a coating liquid containing 0.3 g of cyanine dye, 12 g of a 25% polymer solution, and 10 g of propylene glycol monomethyl ether acetate was prepared. The cyanine dye used was the dye represented by the above formula (6). The coating liquid was applied to the transparent substrate, and the coating film was dried. The coating film was then thermally cured by post baking at 230° C. to obtain infrared cut-off filters of Test Example 15-1 to Test Example 15-5. The infrared cut-off filter of each test example thus obtained had a 1 μm thickness.

Evaluation Method

The infrared absorbance of the infrared cut-off filters of Test Example 15-1 to Test Example 15-5 was evaluated by the same evaluation method as that performed for the infrared cut-off filter of Test Example 11 and the infrared cut-off filter of Test Example 12.

After the transmittance of the infrared cut-off filter was measured, the infrared cut-off filters of Test Example 15-3 to Test Example 15-5, having the absorbance before heating of 0.8 or more among the infrared cut-off filters of the above test examples, were heated to 250° C. The transmittance of the infrared cut-off filter of each test example after heating was measured in the same manner as that performed for the infrared cut-off filter of each test example before heating. From the measurement result of the transmittance, an absorbance was calculated. Thus, an absorbance spectrum of the infrared cut-off filter of each test example after heating was obtained. Then, it was determined whether the absorbance at 950 nm of the infrared cut-off filter of each test example after heating was 0.7 or more.

Evaluation Results

Table 19 below shows the absorbance at 950 nm of the infrared cut-off filters of Test Example 15-1 to Test Example 15-5.

TABLE 19

| Test example | Absorbance (before heating) | Absorbance (after heating) |
| --- | --- | --- |
| 15-1 | 0.79 | — |
| 15-2 | 0.78 | — |
| 15-3 | 0.96 | 0.80 |
| 15-4 | 0.96 | 0.80 |
| 15-5 | 0.99 | 0.82 |

As seen from Table 19, the absorbance before heating of Test Example 15-1 was 0.79, the absorbance before heating of Test Example 15-2 was 0.78, and the absorbance before heating of Test Example 15-3 was 0.96. Further, the absorbance before heating of Test Example 15-4 was 0.96, and the absorbance before heating of Test Example 15-5 was 0.99.

As described above, in the infrared cut-off filters of Test Example 15-1 and Test Example 15-2, the absorbance at 950 nm before heating was found to be less than 0.8. On the other hand, in the infrared cut-off filters of Test Example 15-3 to Test Example 15-5, the absorbance at 950 nm before heating was found to be 0.8 or more. From the above results, as for the infrared cut-off filters before heating, the average molecular weight of acrylic polymer in the infrared cut-off filter is found to be preferably 30,000 or more.

In addition, as seen from Table 19, the absorbance after heating of Test Example 15-3 was 0.80, the absorbance after heating of Test Example 15-4 was 0.80, and the absorbance after heating of Test Example 15-5 was 0.82. As described above, in the infrared cut-off filters of Test Example 15-3 to Test Example 15-5 after heating, the absorbance at 950 nm was found to be 0.7 or more.

As described above, according to an embodiment of the infrared cut-off filter, the solid-state image sensor filter, the solid-state image sensor, and the method for producing a solid-state image sensor filter, the following advantageous effect can be obtained in addition to the advantageous effects of the above (1-2) to (1-5).

(3-1) Since the acrylic polymer contains a cyclic ether group in the side chain, the infrared absorbance of the infrared cut-off filter 13 after heating is prevented from becoming lower than the infrared absorbance of the infrared cut-off filter 13 before heating.

Modifications

The embodiments described above can be modified and implemented as below.

Acrylic Polymer

The glass transition temperature of the acrylic polymer may be lower than 75° C. In this case as well, the effects substantially similar to the above (1-1), (2-1) and (3-1) can be obtained as long as the infrared cut-off filter 13 includes a cyanine dye and an acrylic polymer containing an aromatic ring in the side chain.

The molecular weight of the acrylic polymer may be less than 30,000 or may be larger than 150,000. In this case as well, the effects substantially similar to the above (1-1), (2-1) and (3-1) can be obtained as long as the infrared cut-off filter 13 includes a cyanine dye and an acrylic polymer containing an aromatic ring in the side chain.

The residual amount of monomer in the acrylic polymer may be larger than 20%. In this case as well, the effects substantially similar to the above (1-1), (2-1) and (3-1) can be obtained as long as the infrared cut-off filter 13 includes a cyanine dye and an acrylic polymer containing an aromatic ring in the side chain.

Barrier Layer

The barrier layer 14 may not necessarily be disposed between the infrared cut-off filter 13 and the respective microlenses, but may also be disposed on the outer surface of the respective microlenses. In this case, the outer surface of the barrier layer 14 functions as a light-incident surface of the solid-state image sensor 10 on which light is incident. In short, the barrier layer 14 may be positioned on a light-incident side of the infrared cut-off filter 13. With this configuration, the barrier layer 14 is disposed on an optical surface of the respective microlenses.

The solid-state image sensor 10 can be modified to a configuration in which the barrier layer 14 is omitted and a laminate structure located on a side of the infrared cut-off filter 13 on which the light-incident surface 15S is located has an oxygen transmittance of 5.0 $cc/m^2$/day/atm or less. For example, the laminate structure may be another functional layer such as a planarization layer or an adhesion layer, and have an oxygen transmission rate of 5.0 $cc/m^2$/day/atm or less together with the respective microlenses.

Anchor Layer

The solid-state image sensor 10 can be modified to a configuration in which an anchor layer is disposed between the barrier layer 14 and a layer underlying the barrier layer 14 so that the anchor layer enhances adhesion between the barrier layer 14 and the layer underlying the barrier layer 14. Further, the solid-state image sensor 10 can be modified to a configuration in which an anchor layer is disposed between the barrier layer 14 and a layer overlying the barrier layer 14 so that the anchor layer enhances adhesion between the barrier layer 14 and the layer overlying the barrier layer 14.

A material constituting the anchor layer may be, for example, a polyfunctional acrylic resin or a silane coupling agent. The anchor layer may have a thickness of, for example, 50 nm or more and 1 μm or less. When the thickness is 50 nm or more, adhesion between layers can be easily achieved. When the thickness is 1 μm or less, absorption of light by the anchor layer can be easily suppressed.

Color Filter

The color filters can be modified to those for three colors composed of a cyan filter, a yellow filter, and a magenta filter. Further, the color filters can also be modified to those for four colors composed of a cyan filter, a yellow filter, a magenta filter, and a black filter. Further, the color filters can also be modified to those for four colors composed of a transparent filter, a yellow filter, a red filter, and a black filter.

Others

The infrared cut-off filter may also be a microlens. In this case, the microlens having a function of collecting light toward the photoelectric conversion element also has a function of cutting infrared light. Accordingly, the layer structure provided in the solid-state image sensor filter can be simplified.

Materials constituting the infrared pass filter 12P and the infrared cut-off filter 13 can contain additives such as a photostabilizer, an antioxidant, a thermal stabilizer, and an antistatic agent in order to provide other functions.

The solid-state image sensor 10 may include a band-pass filter on a light-incident side of the plurality of microlenses. A band-pass filter is a filter that transmits only light having specific wavelengths of visible light and near-infrared light, and has a function similar to that of the infrared cut-off filter 13. That is, a band-pass filter can cut off unnecessary infrared light which may otherwise be detected by the respective color photoelectric conversion elements 1R, 11G and 11B. Accordingly, it is possible to improve the accuracy in detection of visible light by the respective color photoelectric conversion elements 11R, 11G and 11B, and detection of near-infrared light in the 850 nm or 940 nm wavelength band by the infrared photoelectric conversion element 11P.

The present application addresses the following. When an infrared cut-off filter is produced, various amounts of cyanine dyes may remain aggregated without being dispersed in a solvent. The infrared absorption properties of the aggregated cyanine dyes impairs infrared absorbance of the cyanine dye constituting the infrared cut-off filter.

Meanwhile, the solid-state image sensor having an infrared cut-off filter is mounted on a mounting substrate by reflow soldering. In this process, the infrared cut-off filter of the solid-state image sensor is heated to a temperature that melts the solder. The heating of the infrared cut-off filter denatures the cyanine dye, which may cause the infrared absorbance of the infrared cut-off filter after heating to become lower than the infrared absorbance of the infrared cut-off filter before heating.

Therefore, it is desired to prevent at least one of the decreases in infrared absorbance of the infrared cut-off filter due to the factors described above.

The present invention has an aspect to provide an infrared cut-off filter capable of suppressing a decrease in infrared absorbance, a solid-state image sensor filter, a solid-state image sensor, and a method for producing a solid-state image sensor filter.

An infrared cut-off filter includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the following formula (1).

<Chem. 1> formula (1)

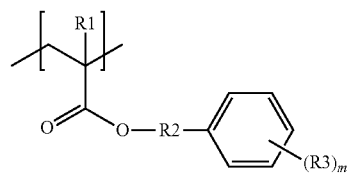

In formula (1), R1 is a hydrogen atom or a methyl group, R2 is a single bond, a linear alkylene group having 1 or more carbon atoms, a branched alkylene group having 3 or more carbon atoms, or an oxyalkylene group having 1 or more carbon atoms. R3 is a hydrogen atom or a predetermined substituent. M is any integer from 1 to 5 when R3 is a substituent.

A method for producing a solid-state image sensor filter includes the steps of: forming an infrared cut-off filter which includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the above formula (1); and patterning the infrared cut-off filter by dry etching.

According to the above configuration, the aromatic ring of the acrylic polymer is located between cyanine dyes adjacent to each other, whereby a distance sufficient to prevent occurrence of aggregation between cyanine dyes can be formed between the cyanine dyes. This prevents a decrease in absorbance at the expected absorption wavelength of the cyanine dye. Accordingly, a decrease in infrared absorbance of the infrared cut-off filter can be suppressed.

An infrared cut-off filter includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the following formula (2).

<Chem. 2>

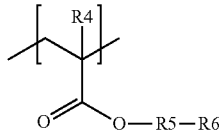

formula (2)

In formula (2), R4 is a hydrogen atom or a methyl group, R5 is a single bond, a linear alkylene group having 1 or more carbon atoms, a branched alkylene group having 3 or more carbon atoms, or an oxyalkylene group having 1 or more carbon atoms. R6 is an alicyclic structure having 3 or more carbon atoms.

A method for producing an infrared cut-off filter includes the steps of: forming an infrared cut-off filter which includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the above formula (2); and patterning the infrared cut-off filter by dry etching.

In formula (2), R4 is a hydrogen atom or a methyl group, R5 is a single bond, a linear alkylene group having 1 or more carbon atoms, a branched alkylene group having 3 or more carbon atoms, or an oxyalkylene group having 1 or more carbon atoms. R6 is an alicyclic structure having 3 or more carbon atoms.

An infrared cut-off filter includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the following formula (3).

<Chem. 3>

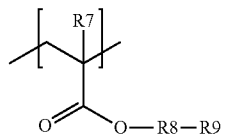

formula (3)

In formula (3), R7 is a hydrogen atom or a methyl group, R8 is a single bond, a linear alkylene group having 1 or more carbon atoms, a branched alkylene group having 3 or more carbon atoms, or an oxyalkylene group having 1 or more carbon atoms. R9 is a cyclic ether group containing an oxygen atom and 2 or more carbon atoms.

A method for producing an infrared cut-off filter includes the steps of: forming an infrared cut-off filter which includes: a cyanine dye containing a cation having a polymethine and a nitrogen-containing heterocycle located at each end of the polymethine, and a tris(pentafluoroethyl) trifluorophosphate anion; and an acrylic polymer having a unit structure represented by the formula (3); and patterning the infrared cut-off filter by dry etching.

A solid-state image sensor filter includes: the infrared cut-off filter described above; and a barrier layer that covers the infrared cut-off filter, the barrier layer being configured to suppress transmission of an oxidation source to thereby prevent the infrared cut-off filter from being oxidized.

According to the above configuration, the barrier layer prevents an oxidation source from reaching the infrared cut-off filter, whereby oxidation of the infrared cut-off filter by the oxidation source is suppressed.

A solid-state image sensor includes: a photoelectric conversion element; and the solid-state image sensor filter described above.

Obviously, numerous modifications and variations of the present invention are possible in light of the above teachings. It is therefore to be understood that within the scope of the appended claims, the invention may be practiced otherwise than as specifically described herein.

What is claimed is:
1. An infrared cut-off filter, comprising:
a cyanine dye including a tris(pentafluoroethyl) trifluorophosphate anion and a cation having a polymethine and a nitrogen-containing heterocycle located at each end of the polymethine; and
an acrylic polymer comprising structural units derived from at least one selected from the group consisting of phenoxyethyl (meth)acrylate, phenoxypolyethylene glycol (meth)acrylate, nonylphenoxy polyethylene glycol (meth)acrylate, phenoxypolypropylene glycol (meth)acrylate, 2-(meth)acryloyloxyethyl-2-hydroxypropyl phthalate, 2-hydroxy-3-phenoxypropyl (meth) acrylate, 2-(meth)acryloyl oxyethyl hydrogen phthalate, 2-(meth)acryloyl oxypropyl hydrogen phthalate, ethoxylated ortho-phenyl phenol (meth)acrylate, o-phenyl phenoxyethyl (meth)acrylate, 3-phenoxy benzyl (meth)acrylate, 4-hydroxyphenyl (meth)acrylate, 2-naphthol (meth)acrylate, 4-biphenyl (meth)acrylate, 9-anthrylmethyl (meth)acrylate, 2-[3-(2H-benzotriazole-2-yl)-4-hydroxyphenyl]ethyl (meth)acrylate, phenol ethylene oxide (EO) modified acrylate, nonylphenol EO modified acrylate, 2-(meth)acryloyloxyethyl phthalate, and 2-(meth)acryloyloxyethyl hexahydrophthalate.

2. The infrared cut-off filter of claim 1, wherein the acrylic polymer has a glass transition temperature of 75° C. or higher.

3. The infrared cut-off filter of claim 1, wherein the acrylic polymer has a weight average molecular weight of 30,000-150,000.

4. The infrared cut-off filter of claim 1, wherein the acrylic polymer satisfies MM/MS×100 being 20% or less, where MM is a mass of an acrylic monomer, and MS is a sum of the mass of the acrylic polymer and a mass of the acrylic monomer forming the acrylic polymer.

5. A solid-state image sensor filter, comprising:
the infrared cut-off filter of claim 1; and
a barrier layer covering the infrared cut-off filter such that transmission of an oxidation source is suppressed, and that oxidation of the infrared cut-off filter is prevented.

6. A solid-state image sensor, comprising:
a photoelectric conversion element; and
the solid-state image sensor filter of claim 5.

7. An infrared cut-off filter, comprising:
a cyanine dye including a tris(pentafluoroethyl) trifluorophosphate anion and a cation having a polymethine and a nitrogen-containing heterocycle located at each end of the polymethine; and
an acrylic polymer comprising structural units derived from at least one selected from the group consisting of 4-t-cyclohexyl (meth)acrylate, dicyclopentanyl acrylate, dicyclopentenyl (meth)acrylate, dicyclopentadienyl (meth)acrylate, and tetracyclododecyl (meth)acrylate.

8. The infrared cut-off filter of claim 7, wherein the acrylic polymer has a glass transition temperature of 75° C. or higher.

9. The infrared cut-off filter of claim 7, wherein the acrylic polymer has a weight average molecular weight of 30,000-150,000.

10. The infrared cut-off filter of claim 7, wherein the acrylic polymer satisfies MM/MS×100 being 20% or less, where MM is a mass of an acrylic monomer, and MS is a sum of the mass of the acrylic polymer and a mass of the acrylic monomer forming the acrylic polymer.

11. A solid-state image sensor filter, comprising:
the infrared cut-off filter of claim 7; and
a barrier layer covering the infrared cut-off filter such that transmission of an oxidation source is suppressed, and that oxidation of the infrared cut-off filter is prevented.

12. A solid-state image sensor, comprising:
a photoelectric conversion element; and
the solid-state image sensor filter of claim 11.

13. An infrared cut-off filter, comprising:
a cyanine dye including a tris(pentafluoroethyl) trifluorophosphate anion and a cation having a polymethine and a nitrogen-containing heterocycle located at each end of the polymethine; and
an acrylic polymer comprising structural units derived from at least one selected from the group consisting of 2-methylglycidyl (meth)acrylate, 2-ethylglycidyl (meth)acrylate, 2-oxiranylethyl (meth)acrylate, 2-glycidyloxyethyl (meth)acrylate, 3-glycidyloxypropyl (meth)acrylate, glycidyloxyphenyl (meth)acrylate, oxetanyl (meth)acrylate, 3-methyl-3-oxetanyl (meth) acrylate, 3-ethyl-3-oxetanyl (meth)acrylate, (3-methyl-3-oxetanyl) methyl (meth)acrylate, (3-ethyl-3-oxetanyl) methyl (meth)acrylate, 2-(3-methyl-3-oxetanyl) ethyl (meth)acrylate, 2-(3-ethyl-3-oxetanyl) ethyl (meth)acrylate, 2-[(3-methyl-3-oxetanyl) methyloxy] ethyl (meth)acrylate, 2-[(3-ethyl-3-oxetanyl) methyl-oxy] ethyl (meth)acrylate, 3-[(3-methyl-3-oxetanyl) methyloxy] propyl (meth)acrylate, 3-[(3-ethyl-3-oxetanyl) methyloxy] propyl (meth)acrylate, and tetrahydrofurfuryl (meth)acrylate.

14. The infrared cut-off filter of claim 13, wherein the acrylic polymer has a glass transition temperature of 75° C. or higher.

15. The infrared cut-off filter of claim 13, wherein the acrylic polymer has a weight average molecular weight of 30,000-150,000.

16. The infrared cut-off filter of claim 13, wherein the acrylic polymer satisfies MM/MS×100 being 20% or less, where MM is a mass of an acrylic monomer, and MS is a sum of the mass of the acrylic polymer and a mass of the acrylic monomer forming the acrylic polymer.

17. A solid-state image sensor filter, comprising:
the infrared cut-off filter of claim 13; and
a barrier layer covering the infrared cut-off filter such that transmission of an oxidation source is suppressed, and that oxidation of the infrared cut-off filter is prevented.

18. A method for producing a solid-state image sensor filter, comprising:
forming an infrared cut-off filter; and
patterning the infrared cut-off filter by dry etching,
wherein the infrared cut-off filter includes a cyanine dye including a tris(pentafluoroethyl) trifluorophosphate anion and a cation having a polymethine and a nitrogen-containing heterocycle located at each end of the polymethine, and an acrylic polymer comprising structural units derived from at least one selected from the group consisting of phenoxyethyl (meth)acrylate, phenoxypolyethylene glycol (meth)acrylate, nonylphenoxy polyethylene glycol (meth)acrylate, phenoxypolypropylene glycol (meth)acrylate, 2-(meth)acryloyloxyethyl-2-hydroxypropyl phthalate, 2-hydroxy-3-phenoxypropyl (meth)acrylate, 2-(meth)acryloyl oxyethyl hydrogen phthalate, 2-(meth)acryloyl oxypropyl hydrogen phthalate, ethoxylated orthophenyl phenol (meth)acrylate, o-phenyl phenoxyethyl (meth)acrylate, 3-phenoxy benzyl (meth)acrylate, 4-hydroxyphenyl (meth)acrylate, 2-naphthol (meth)acrylate, 4-biphenyl (meth)acrylate, 9-anthrylmethyl (meth)acrylate, 2-[3-(2H-benzotriazole-2-yl)-4-hydroxyphenyl]ethyl (meth)acrylate, phenol ethylene oxide (EO) modified acrylate, nonylphenol EO modified acrylate, 2-(meth)acryloyloxyethyl phthalate, and 2-(meth)acryloyloxyethyl hexahydrophthalate.

19. A method for producing a solid-state image sensor filter, comprising:
forming an infrared cut-off filter; and
patterning the infrared cut-off filter by dry etching,
wherein the infrared cut-off filter includes a cyanine dye including a tris(pentafluoroethyl) trifluorophosphate anion and a cation having a polymethine and a nitrogen-containing heterocycle located at each end of the polymethine, and an acrylic polymer comprising structural units derived from at least one selected from the group consisting of 4-t-cyclohexyl (meth)acrylate, dicyclopentanyl acrylate, dicyclopentenyl (meth)acrylate, dicyclopentadienyl (meth)acrylate, and tetracyclododecyl (meth)acrylate.

20. A method for producing a solid-state image sensor filter, comprising:
forming an infrared cut-off filter; and
patterning the infrared cut-off filter by dry etching,
wherein the infrared cut-off filter includes a cyanine dye including a tris(pentafluoroethyl) trifluorophosphate anion and a cation having a polymethine and a nitrogen-containing heterocycle located at each end of the polymethine, and an acrylic polymer comprising structural units derived from at least one selected from the group consisting of 2-methylglycidyl (meth)acrylate, 2-ethylglycidyl (meth)acrylate, 2-oxiranylethyl (meth)acrylate, 2-glycidyloxyethyl (meth)acrylate, 3-glycidyloxypropyl (meth)acrylate, glycidyloxyphenyl (meth)acrylate, oxetanyl (meth)acrylate, 3-methyl-3-oxetanyl (meth)acrylate, 3-ethyl-3-oxetanyl (meth)acrylate, (3-methyl-3-oxetanyl) methyl (meth)acrylate, (3-ethyl-3-oxetanyl) methyl (meth)acrylate, 2-(3-methyl-3-oxetanyl) ethyl (meth)acrylate, 2-(3-ethyl-3-oxetanyl) ethyl (meth)acrylate, 2-[(3-methyl-3-oxetanyl) methyloxy] ethyl (meth)acrylate, 2-[(3-ethyl-3-oxetanyl) methyloxy] ethyl (meth)acrylate, 3-[(3-methyl-3-oxetanyl) methyloxy] propyl (meth)acrylate, 3-[(3-ethyl-3-oxetanyl) methyloxy] propyl (meth)acrylate, and tetrahydrofurfuryl (meth)acrylate.

* * * * *